(12) United States Patent
Wang et al.

(10) Patent No.: US 11,674,793 B2
(45) Date of Patent: Jun. 13, 2023

(54) RESIDUAL THERMAL STRAIN MEASUREMENT METHOD, RESIDUAL THERMAL STRAIN MEASUREMENT DEVICE, AND PROGRAM THEREFOR

(71) Applicant: NAMICS CORPORATION, Niigata (JP)

(72) Inventors: Qinghua Wang, Tsukuba (JP); Shien Ri, Tsukuba (JP); Toshiaki Enomoto, Niigata (JP)

(73) Assignee: NAMICS CORPORATION, Niigata (JP)

( * ) Notice: Subject to any disclaimer, the term of this patent is extended or adjusted under 35 U.S.C. 154(b) by 699 days.

(21) Appl. No.: 16/487,349

(22) PCT Filed: Feb. 19, 2018

(86) PCT No.: PCT/JP2018/005734
§ 371 (c)(1),
(2) Date: Aug. 20, 2019

(87) PCT Pub. No.: WO2018/155378
PCT Pub. Date: Aug. 30, 2018

(65) Prior Publication Data
US 2020/0056880 A1 Feb. 20, 2020

(30) Foreign Application Priority Data

Feb. 23, 2017 (JP) .............................. JP2017-032646

(51) Int. Cl.
*G01B 11/16* (2006.01)
*G01B 11/25* (2006.01)

(52) U.S. Cl.
CPC ............ *G01B 11/16* (2013.01); *G01B 11/254* (2013.01)

(58) Field of Classification Search
CPC .............................. G01B 11/16; G01B 11/254
See application file for complete search history.

(56) References Cited

U.S. PATENT DOCUMENTS

| 6,564,166 B1 | 5/2003 | Ume et al. | |
| 6,731,391 B1 * | 5/2004 | Kao | ..................... G01B 11/254 |
| | | | 250/237 G |

(Continued)

FOREIGN PATENT DOCUMENTS

| JP | 2005010003 A | 1/2005 |
| JP | 2007298343 A | 11/2007 |

(Continued)

OTHER PUBLICATIONS

Bongtae Han, "Thermal Stresses in Microelectronics Subassemblies: Quantitative Characterization Using Photomechanics Methods", Journal of Thermal Stresses, 26:583-613, 2003 (Year: 2003).*

(Continued)

*Primary Examiner* — Regis J Betsch
(74) *Attorney, Agent, or Firm* — Greer, Burns & Crain, Ltd.

(57) ABSTRACT

A residual thermal strain distribution measurement method of measuring a residual thermal strain distribution as residual thermal deformation in a sample generated under application of a thermal load, comprises recording images of a periodic pattern present on the surface of the sample by an image recording unit at a first temperature and a sample formation temperature at which the sample is formed, generating moire fringes based on each recorded image of the periodic pattern, calculating a phase of the moire fringes for the sample at the first temperature, calculating a phase of the moire fringes for the sample at the sample formation temperature, acquiring a phase difference of the moire fringes at the sample formation temperature with respect to the first temperature, and calculating a residual thermal strain of the (Continued)

sample at the first temperature with respect to the sample formation temperature based on the acquired phase difference.

7 Claims, 18 Drawing Sheets

(56) References Cited

U.S. PATENT DOCUMENTS

| 2012/0034044 | A1 | 2/2012 | Sloan |
| 2015/0049331 | A1* | 2/2015 | Ri ............................ G06T 7/42 356/73 |
| 2016/0161249 | A1 | 6/2016 | Ri et al. |

FOREIGN PATENT DOCUMENTS

| JP | 2009162562 A | 7/2009 |
| JP | 2009264852 A | 11/2009 |
| JP | 2011027526 A | 2/2011 |
| WO | 2013136620 A1 | 9/2013 |
| WO | 2015008404 A1 | 1/2015 |

OTHER PUBLICATIONS

William D. Nix, "Mechanical Properties of Thin Films", an incomplete set of class notes fora graduate class at Stanford University: Materials Science and Engineering 353, Mechanical Properties of Thin Films, Jan. 2005 (Year: 2005).*

Wang et al., "Two-dimensional Moiré phase analysis for accurate strain distribution measurement and application in crack prediction", vol. 25, No. 12 | Jun. 12, 2017 | Optics Express, pp. 13465-13480 (Year: 2017).*

ISR issued in Int'l. patent application No. PCT/JP2018/005734, dated May 22, 2018.

Huang et al.; "Recent Progress in Residual Stress Measurement Techniques"; Acta Mechanica Solida Sinica, vol. 26, No. 6, pp. 570-583; Dec. 2013.

Kishimoto et al.; "Measurement of Strain and Stress Distributions in Structural Materials by Electron Moire Method"; Journal of Solid Mechanics and Materials Engineering, vol. 2, No. 6, pp. 812-821; 2008.

Jang et al.; In-Plane Deformation Measurement of Thin Packages Using an Atomic Force Microscope Moire Method With a Pseudo-Phase-Shifting Technique; IEEE Transactions on Components, Packing and Manufacturing Technology; vol. 2, No. 12, Dec. 2012.

Ri et al.; Dynamic Thermal Deformation Measurement of Large-Scale, High-Temperature Piping in Thermal Power Plants Utilizing the Sampling Moire Method and Grating Magnets; Experimental Mechanics (2013); pp. 1635-1646.

Wang et al.; Digital Sampling Moire as a substitute for microscope scanning Moire for high-sensitivity and full-field deformation measurement at micron/nano scales; Applied Optics; vol. 55, No. 25; Sep. 1, 2016.

Kwon et al.; The Experimental and Theoretical Approaches of Contraction Stress Build-Up of Anisotropic Conductive Adhesives for Flip Chip Interconnection; 2005 Electronic Components and Technology Conference; IEEE; pp. 1468-1474.

* cited by examiner

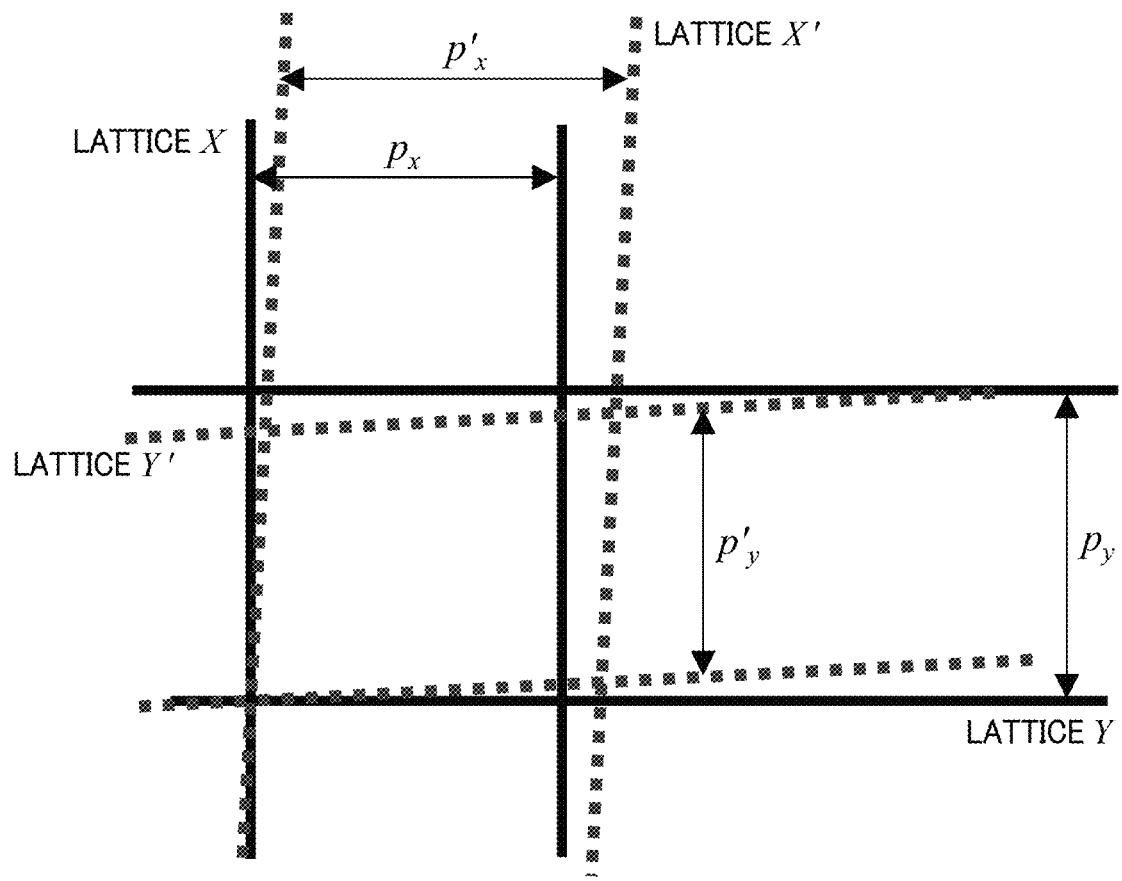
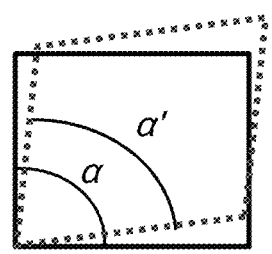
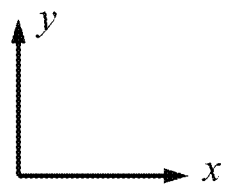
FIG. 2

FIG. 3A LATTICE X

FIG. 3B RECORDED BRIGHTNESS

FIG. 3C DOWNSAMPLED BRIGHTNESS AND SAMPLING MOIRE $N_x$-STEP SPATIAL PHASE SHIFT

FIG. 3D MOIRE PHASE

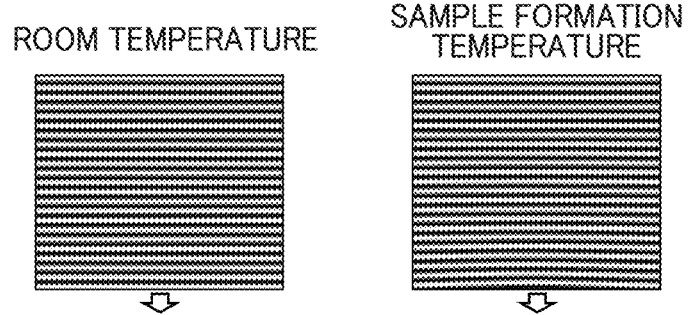
FIG. 5A  LATTICE
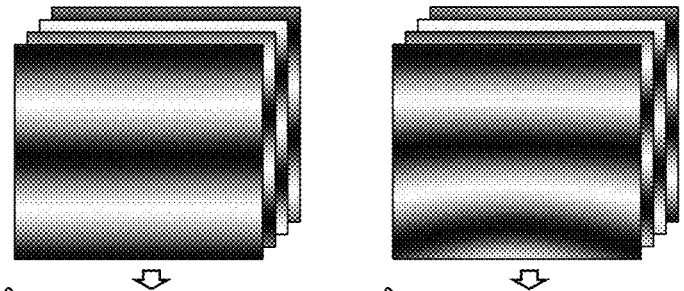
FIG. 5B  MOIRE FRINGE
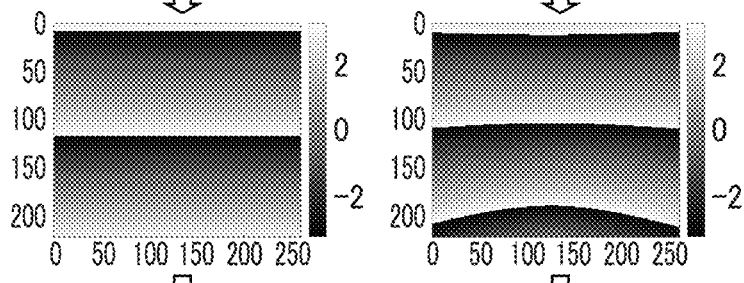
FIG. 5C  WRAPPED PHASE
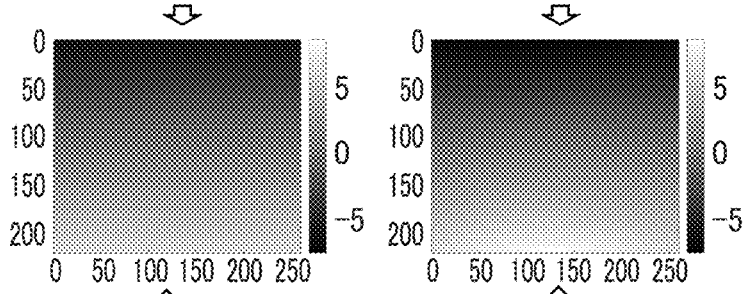
FIG. 5D  UNWRAPPED PHASE
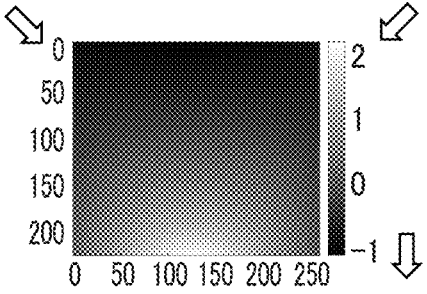
FIG. 5E  PHASE DIFFERENCE
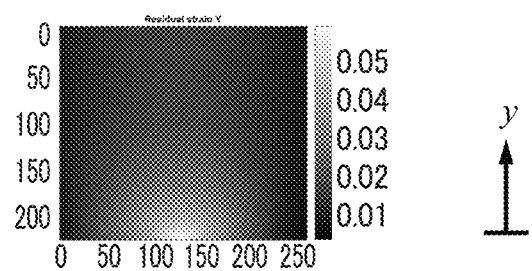
FIG. 5F  RESIDUAL STRAIN FIG. 8A  LATTICE
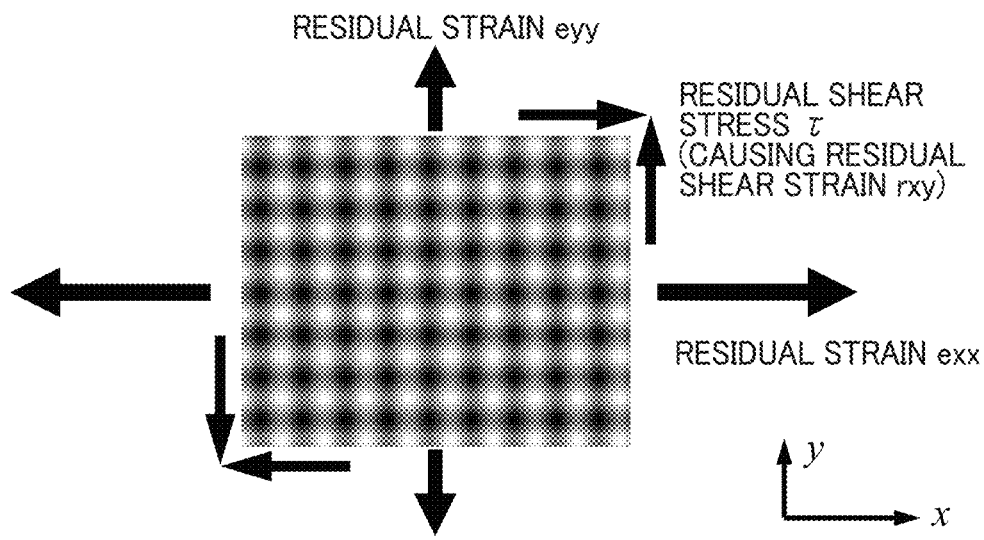
FIG. 8B  RESIDUAL STRAIN
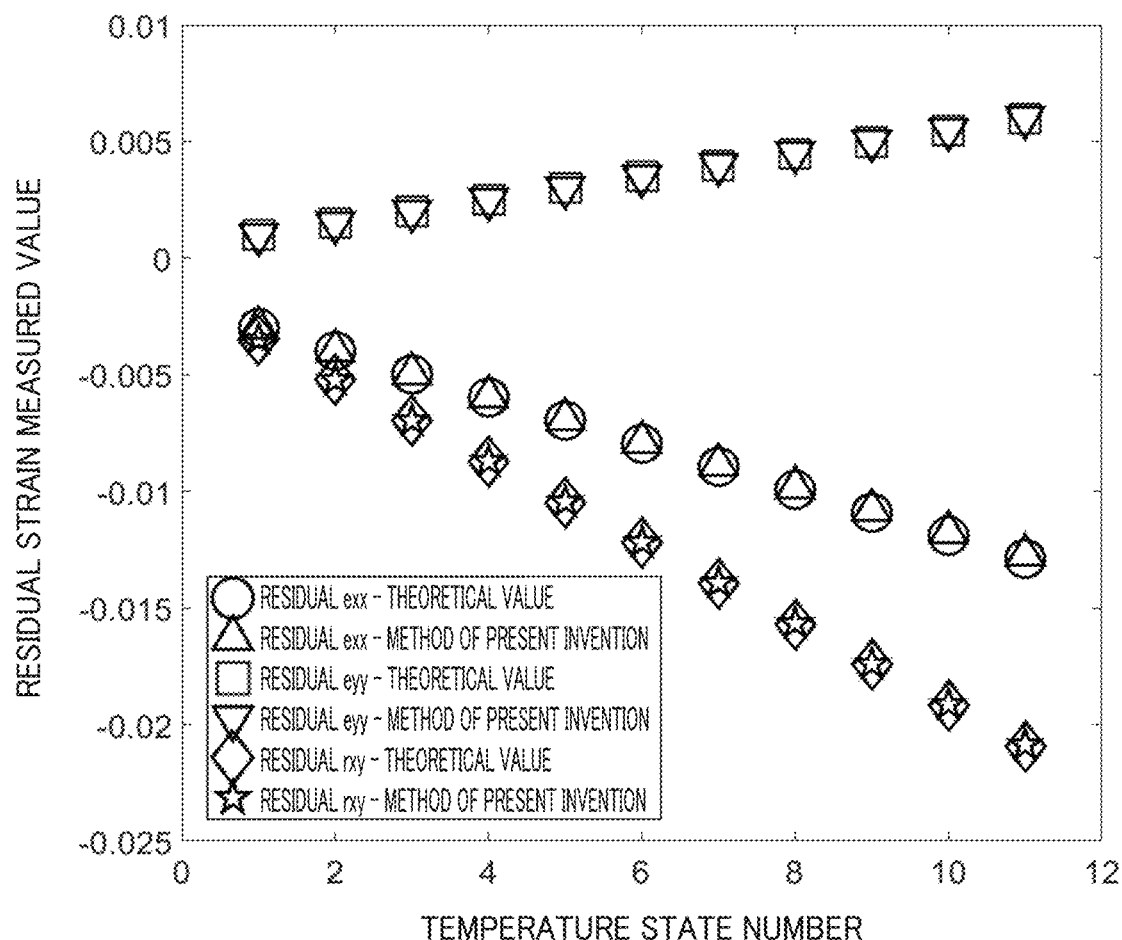

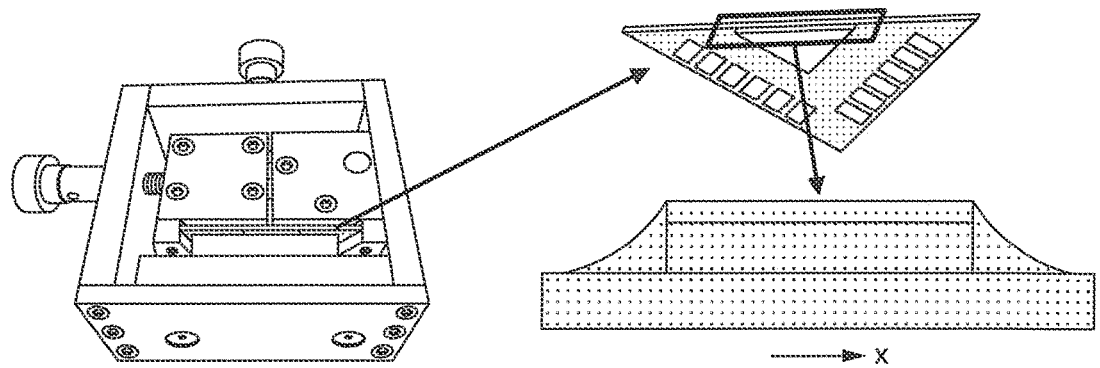
CLAMP JIG FOR CREATING FINE LATTICE ON FLIP CHIP (FC) SURFACE
⇩
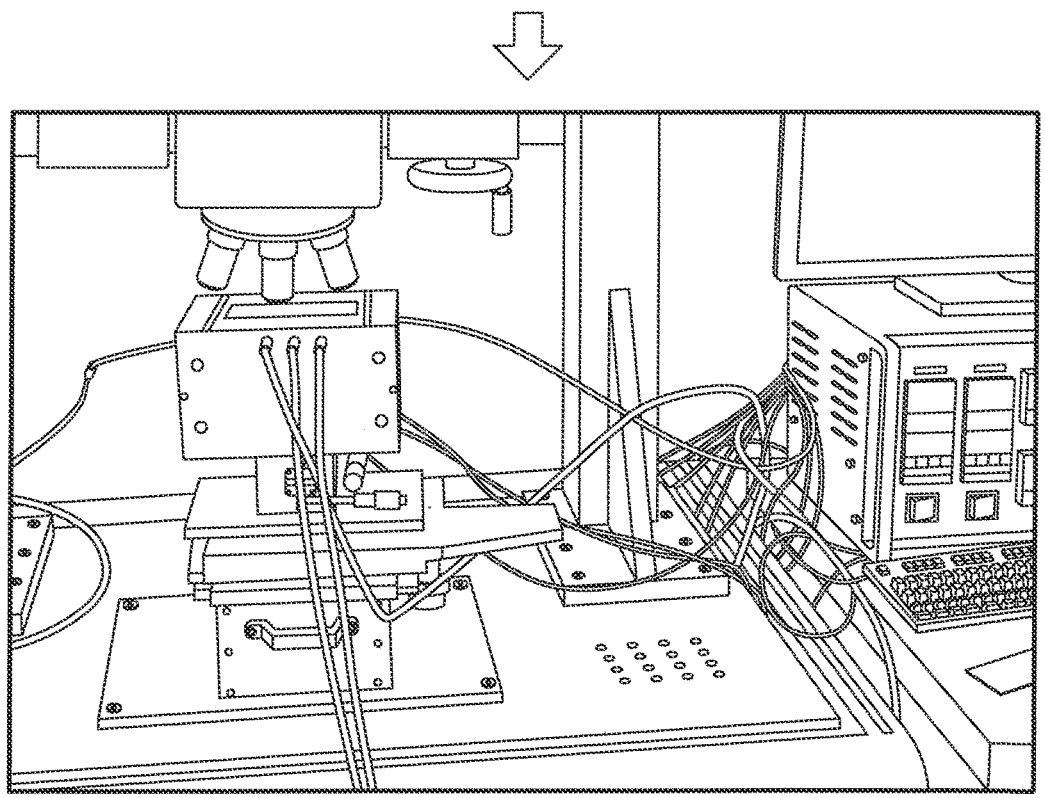
HEAT CONTAINER INSTALLED UNDER SCANNING LASER MICROSCOPE
FIG. 12

FIG. 13A  FC SURFACE
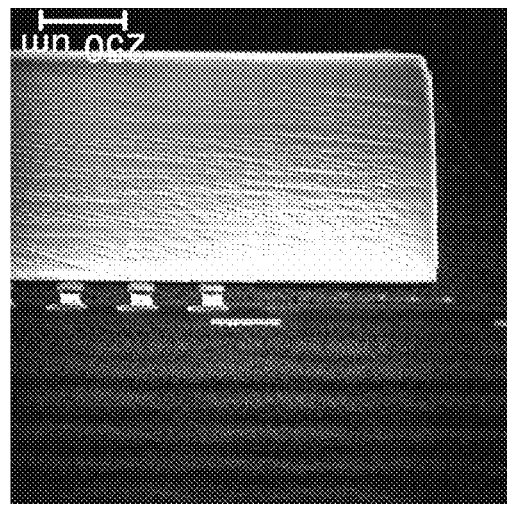
FIG. 13B  AFTER LATTICE FORMATION
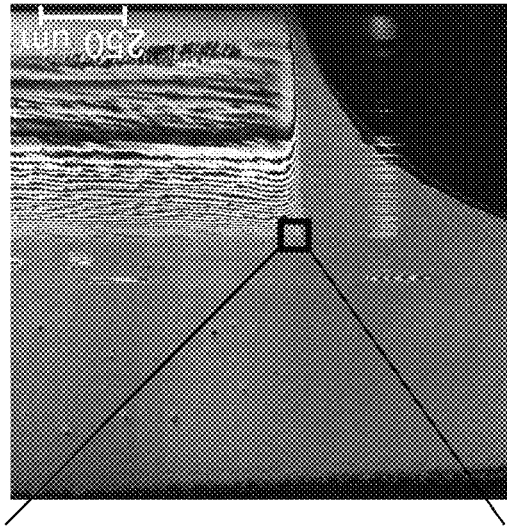
FIG. 13C  3 μm-PITCH LATTICE FORMED ON FC SURFACE
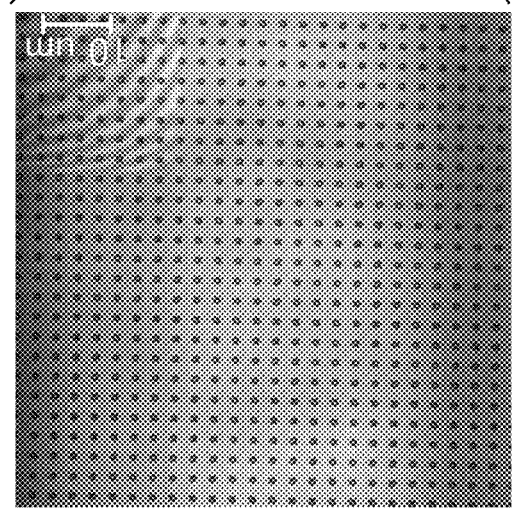

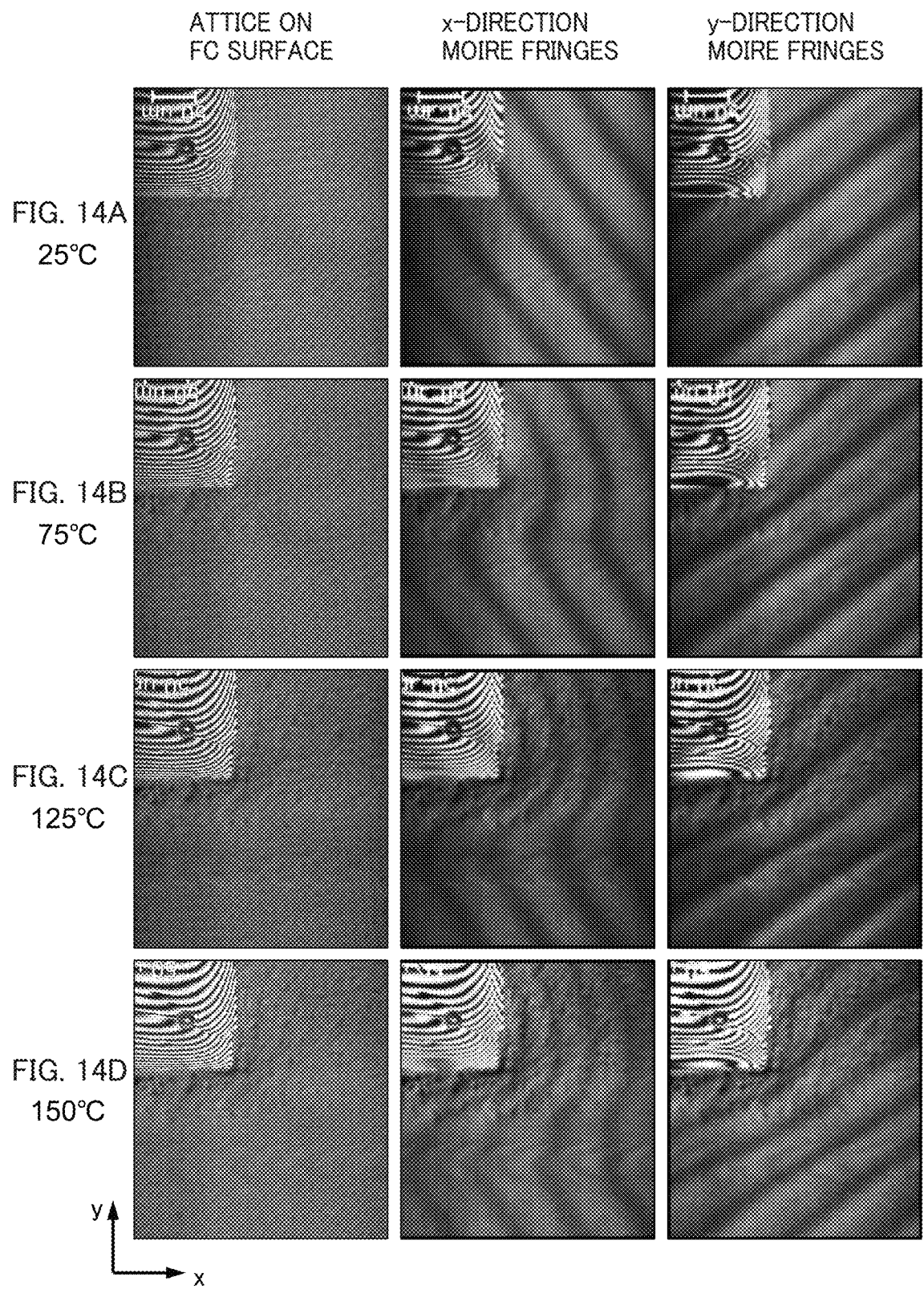

x-DIRECTION MOIRE PHASE    y-DIRECTION MOIRE PHASE
FIG. 15A
25°C
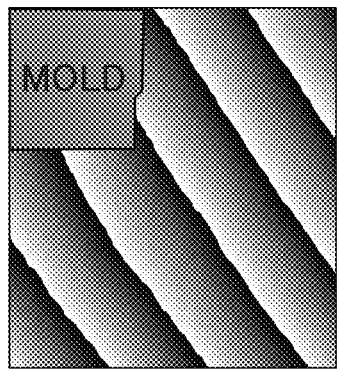 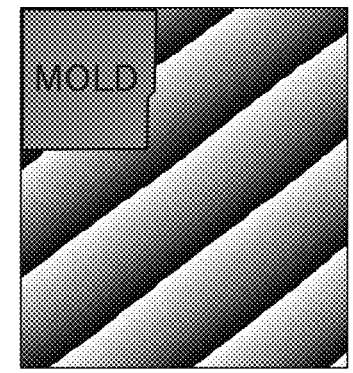
FIG. 15B
75°C
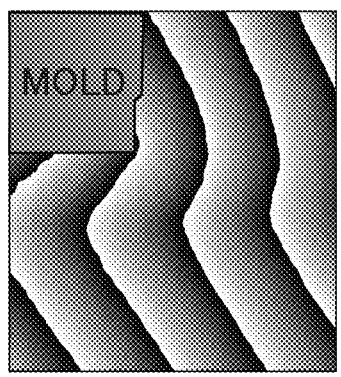 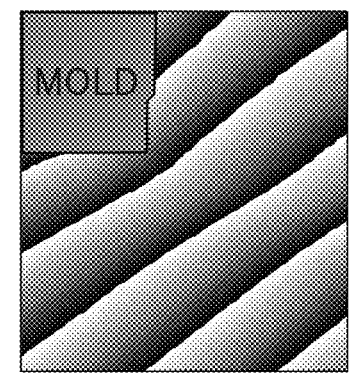
FIG. 15C
125°C
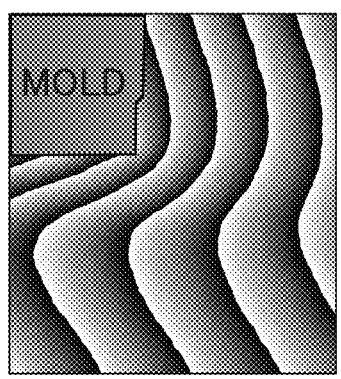 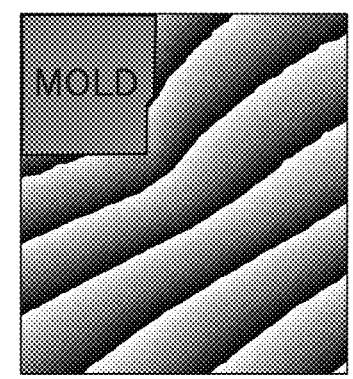
FIG. 15D
150°C
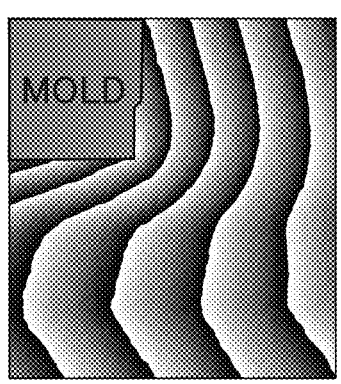 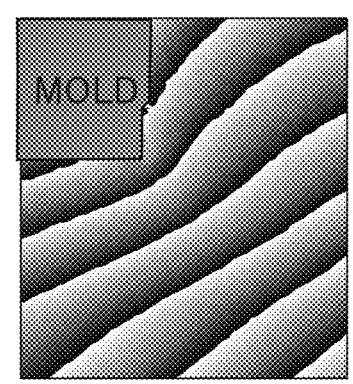

RESIDUAL THERMAL STRAIN MEASUREMENT METHOD, RESIDUAL THERMAL STRAIN MEASUREMENT DEVICE, AND PROGRAM THEREFOR

This is a National Phase Application filed under 35 U.S.C. § 371, of International Application No. PCT/JP2018/005734, filed Feb. 19, 2019, the contents of which are incorporated by reference.

BACKGROUND ART

Technical Field

The present invention relates to a residual thermal strain measurement method, a residual thermal strain measurement device, and a program therefor.

Incorporation by Reference

This application claims the priority of Japanese Patent Application No. 2017-32646 filed on Feb. 23, 2017, the content of which is incorporated into the present application by reference.

Measurement of deformation is essential to assess residual stresses, mechanical properties, unstable behavior, crack generation and propagation in materials and structures. The main techniques currently in use for measuring deformation in a non-contact and non-destructive manner with a full field of view include moire method, digital image correlation (DIC), geometric phase analysis (GPA), Fourier transform (FT), electronic speckle pattern interferometry (ESPI), and so on. Among these techniques, the DIC method is simple but is susceptible to noise because the deformation carriers are speckles. GPA and FT are not suitable for complex deformation measurement because both techniques cannot provide accurate analysis with a lattice image in which multiple frequencies are mixed. ESPI also has the disadvantage of being susceptible to vibration.

Commonly used moire methods are classified into four methods, that is, a microscope scanning moire method, a moire interferometry, a CCD or CMOS moire method (hereinafter simply referred to as "CCD moire method"), and a digital/overlapped moire method. The microscope scanning moire method includes an electron scanning moire and a laser scanning moire. These moire methods utilize moire fringe centering techniques.

In order to further improve the analysis accuracy, a (temporal) phase-shifting moire method and a (spatial) sampling moire method are employed to obtain a phase distribution of moire fringes by introducing a phase-shift method. A multiplication or fractional moire method is generally employed to generate moire fringes, wherein scanning or downsampling is performed at intervals of an integral or fractional multiple of a lattice pitch, in addition to scanning or downsampling at intervals close to the lattice pitch.

It has been reported that the microscope scanning moire method has been applied to measurement of residual stress and residual strain in composite materials, while moire interferometry has been applied to measurement of residual stress and residual strain in electronic component packages and composite materials.

To be more specific, related techniques have been proposed in Patent Literatures 1 and 2 and Non Patent Literatures 1 and 2 listed below. Patent Literature 1 shows a method of measuring a thermal expansion coefficient based on strain caused in a sample by a temperature difference, proposing the method including: forming a grid on a surface of a sample, the grid configured to, when irradiated with a particle beam or an energy beam to the sample body, generate the amount of secondary electrons, the amount of reflected electrons, and reflected light which are different from those of the sample body; and comparing various moire fringes such as electron beam moire fringes, CCD moire fringes, and laser scanning moire fringes, which can be observed by irradiating the above sample with a particle beam or an energy beam due to the difference in the amount of secondary electrons generated, the amount of reflected electrons or reflected light, during heating or cooling of the sample with the various moire fringes observed before the heating or the cooling, thereby measuring the strain caused in the sample.

In consideration of problems that a conventional sampling moire method capable of measuring a minute displacement distribution by generating moire fringes using a regular stripe pattern or a cosine wave or rectangular wave pattern with a black and white ratio of 1:1 to analyze phase information of the moire fringes and then calculating a phase difference distribution from the moire fringes before and after deformation is not suitable for nano/micro materials and large structures, and that a conventional analysis method causes a significant error when applied to a regular pattern with certain repetitions of two or more cycles, Patent Literature 2 proposes the use of phase information in high-order frequency or multiple frequency components of moire fringes generated using a certain regular pattern with one-dimensional or two-dimensional repetitions, which is produced as needed on the object surface or pre-exists on the object surface.

Further, Non Patent Literature 1 relates to a method of measuring a strain distribution and a stress distribution in a structural material, wherein a fine model lattice is formed on a measurement target sample surface by electron beam lithography, and electron beam scanning with a scanning electron microscope is used as a master lattice. Since electron beam moire fringes are generated by performing the electron beam scanning on the model lattice, these moire fringes are analyzed to determine the strain distribution and the stress distribution.

In addition, Non Patent Literature 2 relates to a method of mechanically releasing residual stress, and more particularly refers to a recent optical residual stress detection method and a recent residual stress release method to be combined therewith including a drilling method.

CITATION LIST

Patent Literature

[PTL 1] Japanese Patent Application Publication No. 2009-162562
[PTL 2] International Publication No. 2015/008404

Non Patent Literature

[NPL 1] S. Kishimoto, Y. Xing, Y. Tanaka, and Y. Kagawa, Measurement of Strain and Stress Distributions in Structural Materials by Electron Moire Method, Journal of Solid Mechanics and Materials Engineering, Vol. 2, No. 6, pp. 812-821 (2008)
[NPL 2] X. Huang, Z. Liu, and H. Xie, Recent Progress in Residual Stress Measurement Techniques, Acta Mechanica Solida Sinica, Vol. 26, No. 6, pp. 570-583 (2013)

SUMMARY OF INVENTION

Technical Problem

The related art literatures described above employ the various moire methods listed above. However, these moire methods are considered to have the following problems, for example.

First, in the moire method described above, only approximate calculation of residual strain is performed, and precise distributions cannot be measured simultaneously for x-direction or y-direction residual strain, residual shear strain, and residual principal strain.

The microscope scanning moire method using the moire fringe centering technique only uses information on the center line of the moire fringe, resulting in low deformation measurement accuracy. In addition, since the center line of the moire fringes needs to be manually corrected during measurement, it is difficult to perform the deformation measurement in an automatic batch process.

The (temporal) phase-shift moire method can improve the measurement accuracy for deformation, but is not suitable for dynamic analysis since the method requires a phase-shift device and takes time due to recording of a plurality of images.

In the moire interferometry, because of its very high deformation sensitivity, the moire fringes become very dense as the deformation is increased, and cannot be recorded. Therefore, the increased deformation causes an area which cannot be analyzed. As an example, there is a mold corner in a flip chip mounted part, in which underfill deforms sharply and cannot be measured with the moire interferometry.

The present invention has been made in view of the above and other problems, and it is one object thereof to provide a residual thermal strain measurement method, a residual thermal strain measurement device, and a program capable of accurately measuring a residual thermal strain distribution including x-direction strain, y-direction strain, shear strain, and principal strain from a singly acquired periodic pattern, even when a measurement target sample is significantly deformed.

Solution to Problem

One aspect of the present invention for solving the above and other problems is a residual thermal strain distribution measurement method of measuring a residual thermal strain distribution as residual thermal deformation in a sample generated when a thermal load is applied to the sample, comprising recording images of a periodic pattern present on a surface of the sample, by an image recording unit, at a first temperature and a sample formation temperature that is a temperature at which the sample is formed, generating moire fringes based on each of the recorded images of the periodic pattern, calculating a phase of the moire fringes for the sample at the first temperature, calculating a phase of the moire fringes for the sample at the sample formation temperature, acquiring a phase difference of the moire fringes at the sample formation temperature with respect to the first temperature, and calculating a residual thermal strain of the sample at the first temperature with respect to the sample formation temperature based on the acquired phase difference. Further, another aspect of the present invention includes a deformation measurement device which carries out the deformation measurement method and a program therefor.

Advantageous Effects of Invention

According to the present invention, residual thermal strain distribution including x-direction strain, y-direction strain, shear strain, and principal strain can be accurately measured from a singly acquired periodic pattern, even when a measurement target sample is significantly deformed.

BRIEF DESCRIPTION OF DRAWINGS

FIG. 2 is a diagram showing a geometric relationship of a two-dimensional lattice before and after deformation.

FIG. 5 is a diagram showing a process for measuring one-dimensional residual strain from a one-dimensional lattice.

FIG. 8 is a diagram showing measurement results of two-dimensional residual strain according to the method of the present invention in comparison with theoretical values by temperature state numbers.

FIG. 12 is a diagram showing the dimensions of a flip chip sample, a clamp jig used for nanoimprint lithography, and a heat container under a scanning laser microscope.

FIG. 13 is a diagram showing the surface of the flip chip, its area to be measured, and a lattice formed with a 3 μm pitch.

FIG. 14 is a diagram showing lattices on the sample at 25° C., 75° C., 125° C., and 150° C., and moire fringes in the x and y directions.

FIG. 15 is a diagram showing the phases of the moire fringes in the x and y directions on the sample at 25° C., 75° C., 125° C., and 150° C.

DESCRIPTION OF EMBODIMENTS

Figure 1:
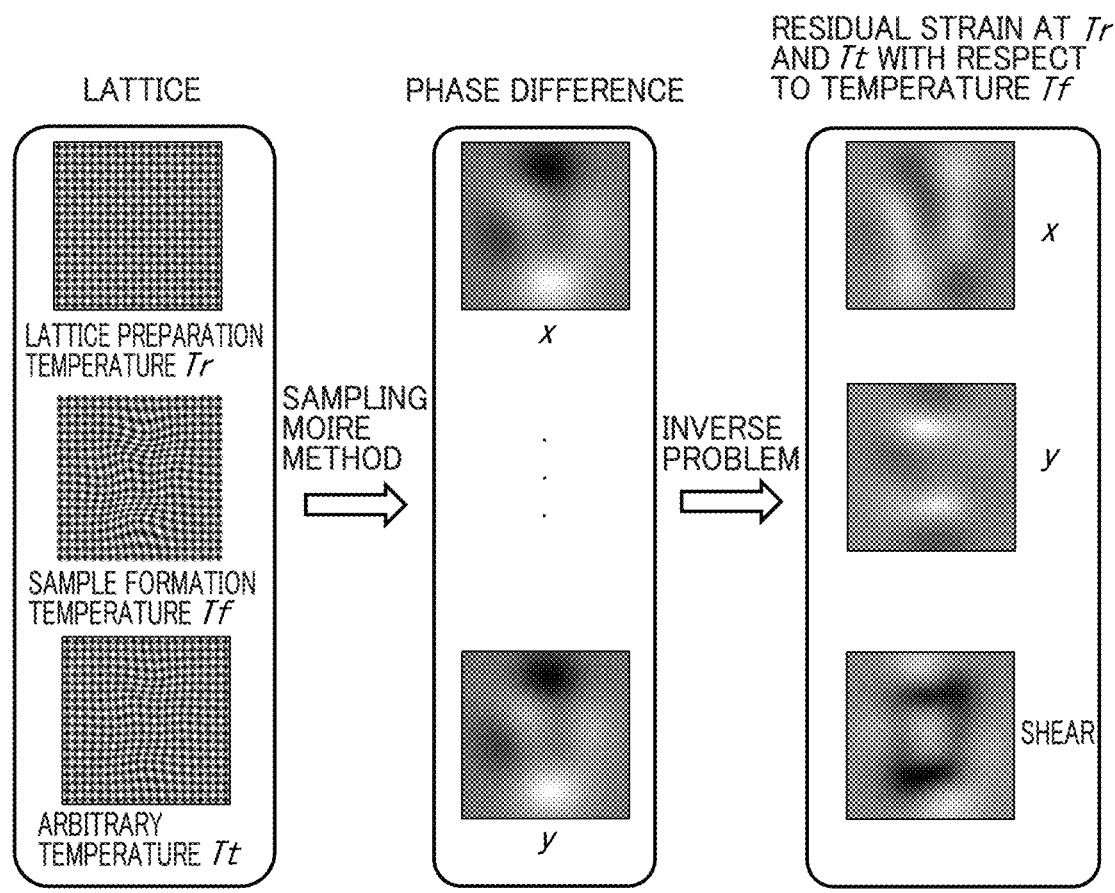
FIG. 1 is a diagram showing the principle of measuring residual strain using a periodic pattern (lattice).

The present application proposes a residual thermal strain measurement moire method capable of accurately measuring in-plane residual thermal deformation by combining a sampling moire (spatial phase-shift) method and its inverse problem analysis. This moire method is related to the fields of electronic component packaging, optical measurement, and experimental mechanics.

The residual thermal strain measurement moire method is useful for measuring residual thermal strain and residual thermal stress distribution of various materials and structures in various industrial fields. Such industrial fields are wide-ranging, such as aerospace, automobile, electronic component packaging, biopharmaceuticals, and material manufacture. Targets of application include metals, polymers, ceramics, semiconductors, composite materials, porous material hybrid structures, thin films, and the like. The method can be widely applied from nanometer scale to metric scale.

Typical applications in the industrial field are as follows.

Visualization of residual thermal stress concentration, dislocation occurrence, and slip formation Prediction of crack occurrence position, crack growth path, and delamination position Evaluation of internal residual thermal stress for buckling, instability, and defect generation mechanism analysis Evaluation of residual thermal deformation level to give guidance on material reinforcement Evaluation of residual thermal deformation characteristics for optimal design of interface Monitoring residual strain state for production quality control Monitoring structural soundness of infrastructure and micro electric mechanical system ==Basic Principle of the Present Invention==

First, description is given of the basic principle of measurement, which is a premise of an embodiment of the present invention, using necessary equations.

Phase Measurement Principle

A two-dimensional periodic pattern (hereinafter, the periodic pattern is abbreviated as "lattice") can be considered as a combination of two one-dimensional lattices, an X-lattice and a Y-lattice. When creating a sample lattice at a temperature Tr (hereinafter, the temperature Tr is simply referred to as "room temperature", but it does not matter if the temperature is not room temperature), the pitch of the lattice X in an x-direction (horizontally rightward) is $p_x$, while the pitch of the lattice Y in a y-direction (vertically upward) is $p_y$. In this event, the brightness of the two-dimensional lattice at room temperature can be expressed in Equation (1).

[Equation 1]

$$I = A_x \cos\left(2\pi \frac{x}{p_x}\right) + A_y \cos\left(2\pi \frac{y}{p_y}\right) + B \quad (1)$$

Note that $A_x$ and $A_y$ are modulated amplitudes of the lattices X and Y, respectively, and B includes background and brightness information on higher-order components.

Using a low-pass filter or Fourier transform, the two-dimensional lattice can be separated into a lattice X and a lattice Y. The brightness of the lattice X and the lattice Y can be expressed in Equations (2) and (3), respectively. Here, $B_x$ is brightness information on the background and higher-order components of the lattice X, $B_y$ is brightness information on the background and higher-order components of the lattice Y, and $\varphi_x$ and $\varphi_y$ represent the phases of the lattices X and Y, respectively.

[Equation 2]

$$I_x = A_x \cos\left(2\pi \frac{x}{p_x}\right) + B_x = A_x \cos\varphi_x + B_x \quad (2)$$

$$I_y = A_y \cos\left(2\pi \frac{y}{p_y}\right) + B_y = A_y \cos\varphi_y + B_y \quad (3)$$

When the temperature of the sample is changed to the temperature Tt, the lattice X and the lattice Y are changed to lattices X' and Y'. FIG. 2 schematically shows how the lattices X and Y are changed in this event. Assuming that the pitch in the x-direction of the lattice X' is $p'_x$ and the pitch in the y-direction of the lattice Y' is $p'_y$, the brightness at the temperature Tt of the two-dimensional lattice, the lattice X' and the lattice Y' can be expressed in the same manner as Equations (1) to (3).

Figure 3:
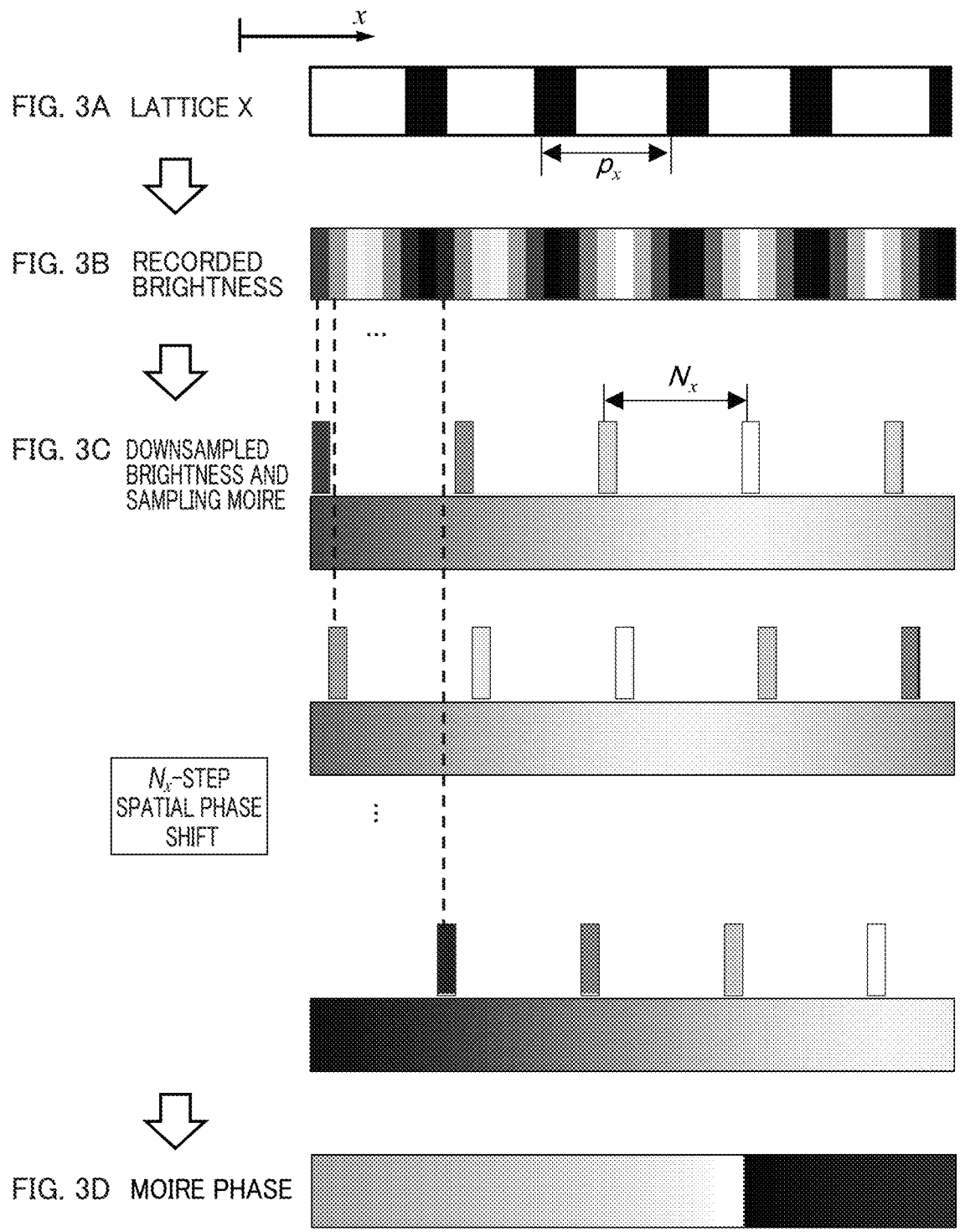
FIG. 3 is a diagram showing the principle of a sampling moire method of calculating a phase from the lattice.

For the lattice X and the lattice X', spatial phase-shift moire fringes in the x-direction can be generated from downsampling and brightness interpolation, with a decimation number Nx. FIG. 3 schematically shows the generation process. The brightness of the phase-shift moire fringes in the Nx step at the temperature Tr can be expressed in Equation (4).

[Equation 3]

$$I_{mx}(k_x) = A_x \cos\left[2\pi\left(\frac{x}{p_x} - \frac{x}{N_x} + \frac{k_x}{N_x}\right)\right] + B_x \quad (4)$$

$$= A_x \cos\left[\varphi_{mx} + 2\pi\frac{k_x}{N_x}\right] + B_x$$

$(k_x = 0, 1, \ldots, N_x - 1)$

Note that $\varphi_{mx}$ represents the phase of the moire fringes when $k_x=0$, which is generated from the lattice X in the x-direction.

For the lattice Y and the lattice Y', spatial phase-shift moire fringes in the y-direction can be generated from downsampling and brightness interpolation, with a decimation number Ny. The brightness of the phase-shift moire fringes in the Ny step at the temperature Tr can be expressed in Equation (5).

[Equation 4]

$$I_{my}(k_y) = A_y \cos\left[2\pi\left(\frac{y}{p_y} - \frac{y}{N_y} + \frac{k_y}{N_y}\right)\right] + B_y \quad (5)$$

$$= A_y \cos\left[\varphi_{my} + 2\pi\frac{k_y}{N_y}\right] + B_y$$

$(k_y = 0, 1, \ldots, N_y - 1)$

Note that $\varphi_{my}$ represents the phase of the moire fringes when $k_y=0$ generated from the lattice Y in the y-direction.

The phases $\varphi_{mx}$ and $\varphi_{my}$ of the moire fringes in Equations (4) and (5) can be calculated with the phase-shift method as in Equation (6) using a discrete Fourier transform algorithm.

[Equation 5]

$$\varphi_{mj} = -\arctan \frac{\sum_{k_j=0}^{T_j-1} I_{mj}(k_j)\sin(2\pi k_j/N_j)}{\sum_{k_j=0}^{T_j-1} I_{mj}(k_j)\cos(2\pi k_j/N_j)} \quad (j = x, y) \quad (6)$$

Similarly, the phase of moire fringes at the temperature Tt can also be calculated.

Next, description is given of the measurement principle for thermal displacement and thermal strain.

From Equations (2) and (4), the phase difference of the moire fringes in the x-direction is equal to the phase difference of the lattice X and can be determined from Equation (7).

[Equation 6]

$$\Delta\varphi_{mx} = \varphi'_{mx} - \varphi_{mx} \quad (7)$$
$$= 2\pi\left(\frac{x}{p'_x} - \frac{x}{N_x}\right) - 2\pi\left(\frac{x}{p_x} - \frac{x}{N_x}\right)$$
$$= 2\pi\left(\frac{x}{p'_x} - \frac{x}{p_x}\right) = \Delta\varphi_x.$$

From equations (3) and (5), the phase difference of the moire fringes in the y-direction is equal to the phase difference of the lattice Y and can be determined from Equation (8).

[Equation 7]

$$\Delta\varphi_{my} = \varphi'_{my} - \varphi_{my} \quad (8)$$
$$= 2\pi\left(\frac{y}{p'_y} - \frac{y}{N_y}\right) - 2\pi\left(\frac{y}{p_y} - \frac{y}{N_y}\right)$$
$$= 2\pi\left(\frac{y}{p'_y} - \frac{y}{p_y}\right) = \Delta\varphi_y.$$

Assuming now that the displacements of the sample in the x-direction and y-direction are $u_x$ and $u_y$, respectively, the phase difference between the lattice X and the lattice Y caused by the temperature change can be determined by Equations (9) and (10).

[Equation 8]

$$\Delta\varphi_x = -2\pi\frac{u_x}{p_x} = \Delta\varphi_{mx} \quad (9)$$

$$\Delta\varphi_y = -2\pi\frac{u_y}{p_y} = \Delta\varphi_{my} \quad (10)$$

Equations (9) and (10) represent the relationship between the phase difference of the moire fringes and the displacement of the sample.

Therefore, the displacement of the sample in the x-direction and y-direction can be measured using Equation (11).

[Equation 9]

$$\begin{cases} u_x = -\dfrac{p_x}{2\pi}\Delta\varphi_{mx} \\ u_y = -\dfrac{p_y}{2\pi}\Delta\varphi_{my} \end{cases} \quad (11)$$

Since strain in different directions is a partial derivative of displacement, x-direction strain, y-direction strain, and shear strain can be expressed by the following Equation (12).

[Equation 10]

$$\begin{cases} \varepsilon_{xx} = \dfrac{\partial u_x}{\partial x} = -\dfrac{p_x}{2\pi}\dfrac{\partial \Delta\varphi_{mx}}{\partial x} \\ \varepsilon_{yy} = \dfrac{\partial u_y}{\partial y} = -\dfrac{p_y}{2\pi}\dfrac{\partial \Delta\varphi_{my}}{\partial y} \\ \gamma_{xy} = \dfrac{\partial u_x}{\partial y} + \dfrac{\partial u_y}{\partial x} = -\dfrac{p_x}{2\pi}\dfrac{\partial \Delta\varphi_{mx}}{\partial y} - \dfrac{p_y}{2\pi}\dfrac{\partial \Delta\varphi_{my}}{\partial x} \end{cases} \quad (12)$$

From Equations (11) and (12), thermal displacement and thermal strain at an arbitrary temperature Tt with respect to the room temperature Tr can be determined. Assuming that the internal stress and strain of the sample are zero at the sample formation temperature Tf, the internal strain at other temperatures is referred to as residual thermal strain.

Measurement Principle of Residual Thermal Strain

Since the strain in the x-direction can be determined from the change in pitch, that is, $\varepsilon_x = (p'_x - p_x)/p_x$, the temperature Tt with respect to the room temperature Tr and the thermal strain in the x-direction at Tf can be expressed as in Equation (13) based on the relationship between the lattice pitches.

[Equation 11]

$$\varepsilon_{xx(Tt)} = \frac{p_{x(Tt)} - p_{x(Tr)}}{p_{x(Tr)}} \quad (13)$$

$$\varepsilon_{xx(Tf)} = \frac{p_{x(Tf)} - p_{x(Tr)}}{p_{x(Tr)}}$$

Based on Equation (13), vertical residual strain at the temperature Tt with respect to the temperature Tf can also be expressed by a change in pitch. Therefore, the residual strain in the x-direction at the temperature Tt can be obtained from the thermal strain in the x-direction at the temperatures Tt and Tf using Equation (14).

[Equation 12]

$$\varepsilon_{xx(Tt)Resid} = \frac{p_{x(Tt)} - p_{x(Tf)}}{p_{x(Tf)}} = \frac{\varepsilon_{xx(Tt)} - \varepsilon_{xx(Tf)}}{1 + \varepsilon_{xx(Tf)}} \quad (14)$$

Similarly, the residual thermal strain in the y-direction at the temperature Tt can be obtained from the thermal strain in the y-direction at the temperatures Tt and Tf using Equation (15). Further, residual thermal strain at a room temperature can be obtained from only two lattice images using Equation (16).

[Equation 13]

$$\varepsilon_{yy(Tt)Resid} = \frac{\varepsilon_{yy(Tt)} - \varepsilon_{yy(Tf)}}{1 + \varepsilon_{yy(Tf)}} \quad (15)$$

$$\varepsilon_{yy(Tr)Resid} = -\frac{\varepsilon_{yy(Tf)}}{1 + \varepsilon_{yy(Tf)}} \quad (16)$$

Shear strain means that the crossing angle of the sample lattice changes. That is, when α' represents the angle after deformation, $\gamma_{xy}=-(\alpha'-\alpha)$, and when the crossing angle changes from the original right angle to an acute angle, $\gamma_{xy}$ is positive. The thermal shear strain at the temperatures Tt and Tf with respect to the room temperature Tr can be expressed in Equations (17) and (18), respectively.

[Equation 14]

$$\gamma_{xy(Tt)}=-(\alpha_{(Tt)}-\alpha_{(Tr)}) \quad (17)$$

$$\gamma_{xy(Tf)}=-(\alpha_{(Tf)}-\alpha_{(Tr)}) \quad (18)$$

The residual shear strain at the temperature Tt with respect to the temperature Tf can also be obtained from the change in angle based on Equations (17) and (18). Therefore, the residual shear strain at the temperature Tt can be obtained from the thermal shear strain at the temperatures Tt and Tf using Equation (19).

[Equation 15]

$$\gamma_{xy(Tt)Resid}=-(\alpha_{(Tt)}-\alpha_{(Tf)})=\gamma_{xy(Tt)}-\gamma_{xy(Tf)} \quad (19)$$

From the above, the x-direction residual thermal strain, the y-direction residual thermal strain, and the residual shear thermal strain at any temperature can be determined using Equations (14), (15), and (19). The thermal strain at the temperatures Tt and Tf, that is, $\varepsilon_{xx}(Tt)$, $\varepsilon_{yy}(Tt)$, $\gamma_{xy}(Tt)$, $\varepsilon_{xx}(Tf)$, $\varepsilon_{yy}(Tf)$, and $\gamma_{xy}(Tf)$ can be calculated from Equation (12).

Measurement Principle of Residual Principal Strain and Residual Principal Stress After measuring thermal strain and residual thermal strain, thermal principal strain and residual principal strain can be determined by analyzing the strain state. For the plane stress problem, the residual principal thermal strain can be calculated by the following equation.

[Equation 16]

$$\varepsilon_{max\,Resid} = \frac{\varepsilon_{xx\,Resid} + \varepsilon_{yy\,Resid}}{2} + \sqrt{\left(\frac{\varepsilon_{xxResid} - \varepsilon_{yyResid}}{2}\right)^2 + \frac{\gamma_{xyResid}^2}{4}} \quad (20)$$

$$\varepsilon_{min\,Resid} = \frac{\varepsilon_{xx\,Resid} + \varepsilon_{yy\,Resid}}{2} - \sqrt{\left(\frac{\varepsilon_{xxResid} - \varepsilon_{yyResid}}{2}\right)^2 + \frac{\gamma_{xyResid}^2}{4}}$$

Also, for the plane stress problem, the residual principal stress can be calculated as follows by Hooke's law. Note that E and υ are the Young's modulus and Poisson's ratio of the measurement target sample, respectively.

[Equation 17]

$$\sigma_{max\,Resid} = \frac{E}{(1+v)(1-2v)}[(1-v)\varepsilon_{max\,Resid} + v\varepsilon_{min\,Resid}] \quad (21)$$

$$\sigma_{min\,Resid} = \frac{E}{(1+v)(1-2v)}[(1-v)\varepsilon_{min\,Resid} + v\varepsilon_{max\,Resid}]$$

Procedure of Residual Thermal Deformation Measurement

Figure 4:
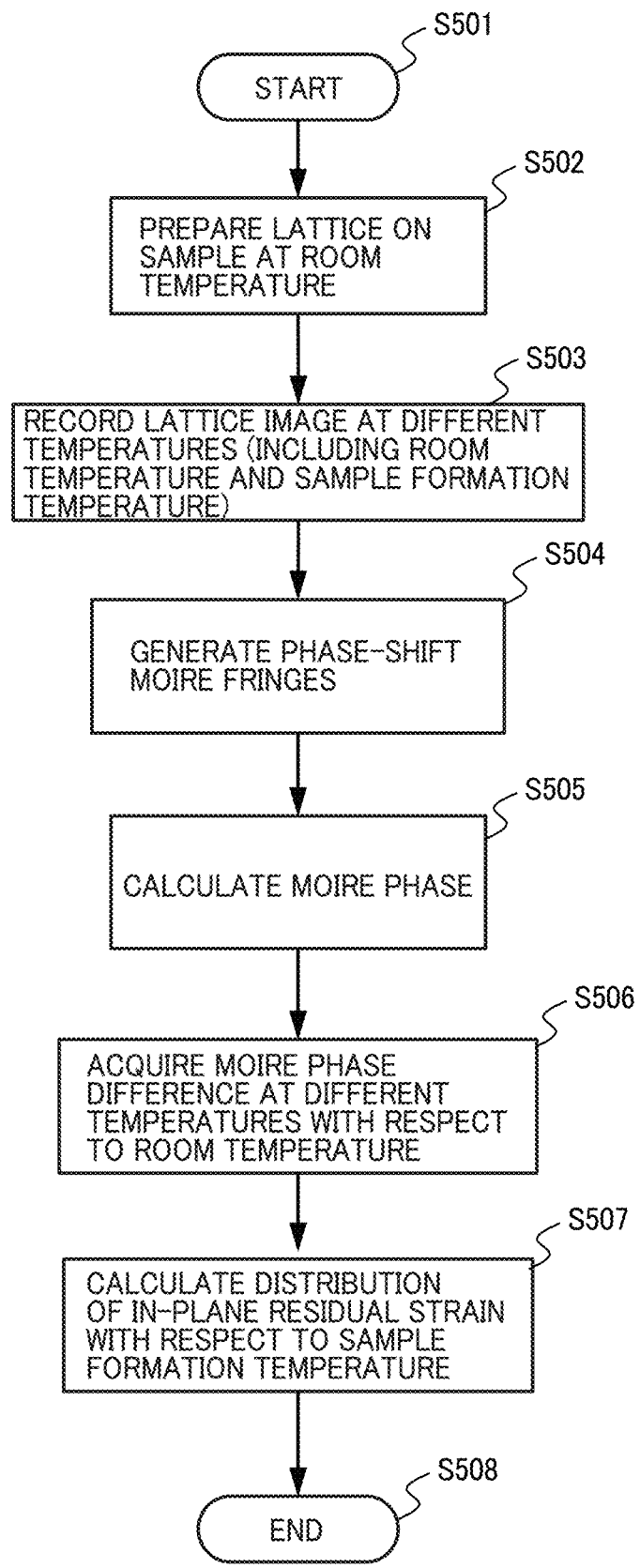
FIG. 4 is a diagram illustrating a flowchart of a residual strain measurement method according to the present invention.

FIG. 4 shows an example of a flowchart of a two-dimensional phase analysis moire method of measuring residual thermal deformation. In execution of the two-dimensional phase analysis moire method, when there is no periodic pattern on the surface of a sample after the start of the processing (S501), a lattice is first created on the sample at a room temperature (S502). Next, an image of the created lattice is recorded by an image recording unit such as a microscope or an image sensor (S503). This image recording is performed at different temperatures (including a room temperature and a sample formation temperature at which the amount of residual strain at the time of sample formation is zero).

Then, the recorded lattice image is downsampled at an interval close to the pitch of the sample lattice. The pitch may be an integral multiple or an integral fraction of the sample lattice. Further, brightness interpolation is performed on the recorded lattice image to generate moire fringes (x-direction and y-direction) of the sample (S504). Thereafter, phases (x-direction and y-direction) of the moire fringes at different temperatures are calculated by spatial phase shift using a Fourier transform algorithm (S505).

After determining the phase difference of the moire fringes before and after deformation of the sample (S506), a residual strain distribution can be obtained based on phase analysis and inverse problem analysis (S507). The two-dimensional phase analysis moire method ends after a series of processing described above (S508). Note that corresponding residual thermal stress distribution can also be further calculated from the calculated residual thermal strain distribution by applying Hooke's law in the plane stress problem.

FIG. 5 illustrates in detail the procedure for determining the residual strain in the y-direction from a one-dimensional lattice. FIG. 5 schematically shows the processing procedure described with reference to FIG. 4, including (a) creation of one-dimensional lattice at a room temperature and a sample formation temperature, (b) generation of moire fringes, (c) calculation of a wrapped phase, (d) calculation of an unwrapped phase, (e) calculation of a phase difference, and (f) calculation of residual strain in y-direction of the sample at the room temperature with respect to the sample formation temperature. The residual strain in the x-direction can be calculated by the same calculation procedure. Also, with a two-dimensional dot or mesh lattice, two-dimensional residual thermal strain can be measured.

Measurement Device and Measurement Program

Figure 6:
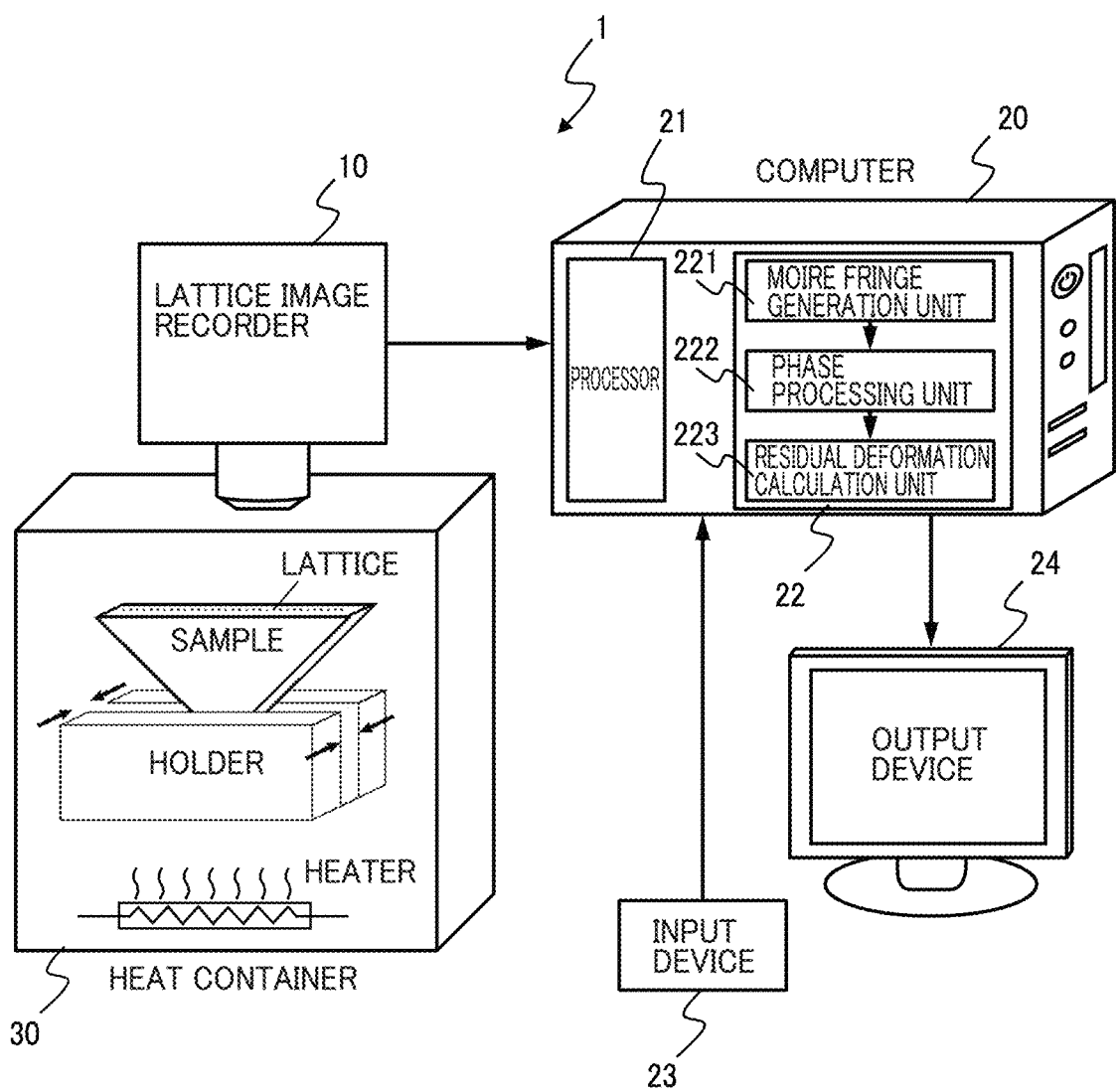
FIG. 6 is a diagram showing an exemplary configuration of a residual strain measurement device according to an embodiment of the present invention.

Next, description is given of a residual thermal strain measurement device according to an embodiment of the present invention. FIG. 6 shows a configuration example of a residual thermal strain measurement device 1. As shown in FIG. 6, the residual thermal strain measurement device 1 includes a lattice image recorder 10 and a computer 20, and has a function of measuring the degree of deformation of a sample when a thermal load is applied to the sample fixed to a holder inside a heat container 30 by a heater. The lattice image recorder 10 includes a microscope, an image sensor, or the like, and has a function of temporarily recording an optically acquired lattice image as digital data in a memory and supplying the digital image to the computer 20. The computer 20 is an information processor provided with an appropriate processor 21 such as an MPU and a CPU, and a storage device 22 such as a ROM, a RAM, and an NVRAM, and includes an input device 23 such as a keyboard and an output device 24. In the example of FIG. 6, the output device 24 is an appropriate type of monitor display, but may be another output device such as a printer. The computer 20 can be provided with a communication module that can be coupled to an external communication network, and can be configured to be communicable with another information processor.

The storage device 22 in the computer 20 stores respective functional units, including a moire fringe generation unit 221, a phase processing unit 222, and a residual deformation calculation unit 223. The moire fringe generation unit 221, the phase processing unit 222, and the residual deformation calculation unit 223 can be configured as computer programs, respectively, to be read and executed from the storage device 22 by the processor 21 as appropriate. A trigger for program execution can be given by an instruction from the input device 23.

In the heat container 30, a thermal load is applied to various samples to be measured, each having a lattice created thereon, to deform the sample. As described above, a configuration can be adopted in which the sample can be fixed to the holder installed in the heat container 30 and heated by an appropriate type of heater.

The lattice image recorder 10 records the degree of deformation of the sample as an image of the lattice formed on the sample, and provides the image to the computer 20. The image data is taken into the computer 20 through an appropriate storage device such as a USB memory or an appropriate communication interface.

Figure 7:
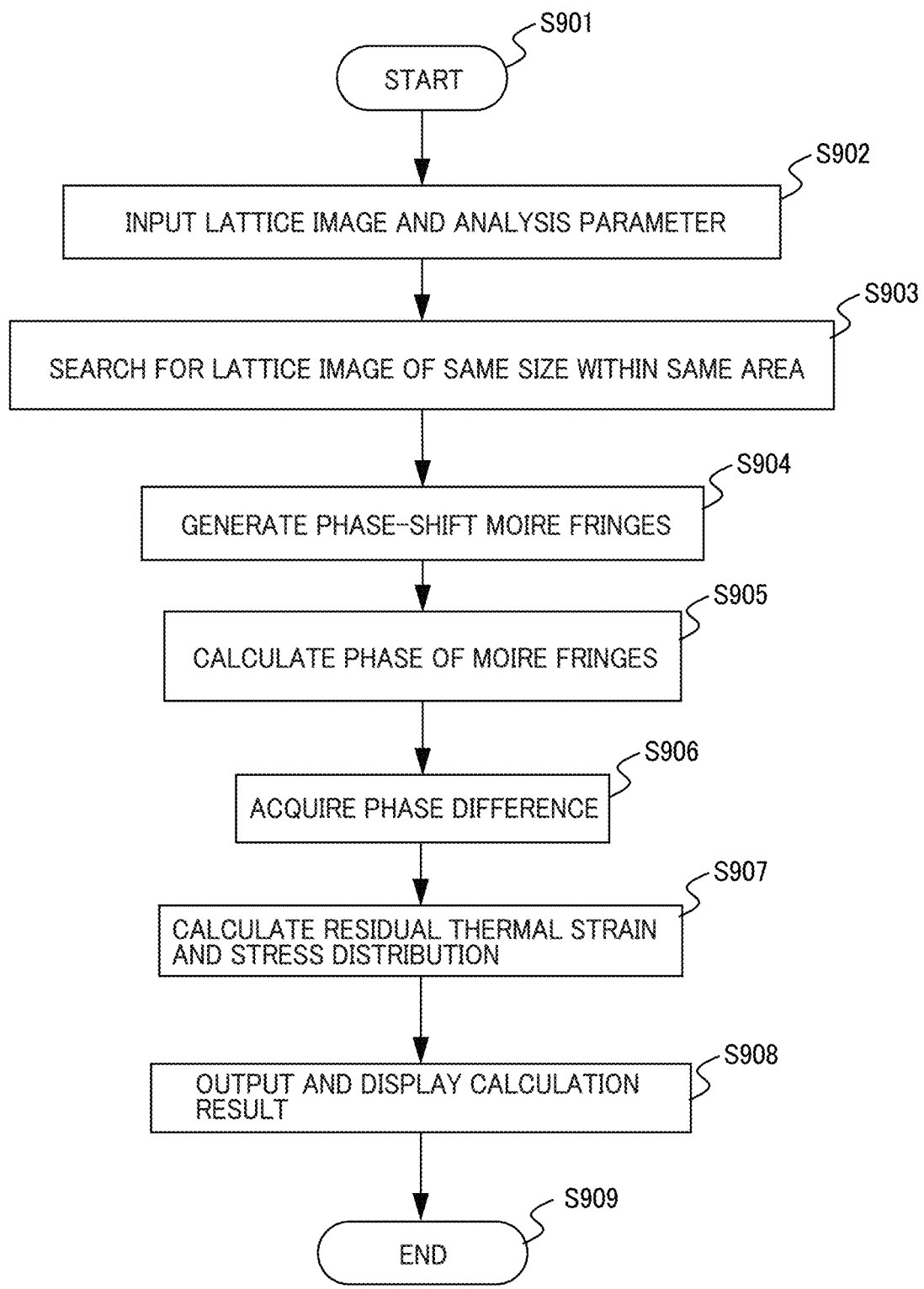
FIG. 7 is a diagram showing an example of a flowchart of residual strain measurement processing by the measurement device shown in FIG. 6.

Next, description is given of residual strain measurement processing of the sample, which is performed by the residual thermal strain measurement device 1 shown in FIG. 6. FIG. 7 shows an example of a processing flow of the residual strain measurement processing of the sample. Once the processing is started (S901), lattice image data is first retrieved from the lattice image recorder 10, and analysis parameters for analysis processing are inputted from the input device 23 (S902). The analysis parameters are, for example, parameters required for the two-dimensional phase analysis processing of the present invention described above, such as the lattice pitch p shown in FIG. 2, the Young's modulus which is a physical property as a material of the measurement target sample, and Poisson's ratio.

The moire fringe generation unit 221 searches for lattice images of the same size from the same area of the sample surface to be measured (S903). Next, the moire fringe generation unit 221 generates phase-shift moire fringes after filtering the lattice image (S904). The filtering process is processing of separating the lattice in the x-direction and the y-direction, and is omitted in the case of one-dimensional moire fringes, for example. Then, the phase processing unit 222 calculates a wrapped phase of the generated moire fringes to acquire a phase difference from the unwrapped or wrapped phase at different temperatures of the sample (S905 and S906). Thereafter, the residual deformation calculation unit 223 uses the acquired phase difference to calculate a residual thermal strain distribution (S907) and outputs the calculation result to the output device 24 before terminating the processing (S908 and S909). In the case of calculating the residual thermal stress, a corresponding processing step is provided after the processing in S907.

EXAMPLE 1

Simulation Verification on Two-Dimensional Residual Strain Measurement of the Present Invention In this example, measurement accuracy of the x-direction and y-direction residual thermal strain and shear residual thermal strain measurement according to the present invention is verified by simulation. The lattice pitch in the x-direction and y-direction is 10 pixels each, and the size of the lattice image is 370×570 pixels. FIG. 8(*a*) shows apart of the two-dimensional lattice at room temperature. A state where the sample is deformed by applying x-direction strain, y-direction strain, and shear strain thereto is considered as a state where the residual thermal strain is zero (sample formation temperature). The strain of the lattice at a room temperature with respect to the lattice after deformation is considered as the residual thermal strain. The residual thermal strain is analyzed when temperature states (simply proportional increase) of 11 different conditions are changed. Note that, in the following, "residual thermal strain" is also simply referred to as "residual strain" to avoid complication.

The residual strain distribution in the x-direction and y-direction and the residual shear strain distribution are measured using Equations (14), (15), and (19). The average value of the residual strain measurement values with respect to the crossing angle of the two-dimensional lattice is compared with a theoretical residual strain value shown in FIG. 8(*b*). It is confirmed from this comparison result that the measured value of residual strain according to the method of the present invention matches well with the theoretical value.

Figure 9A:
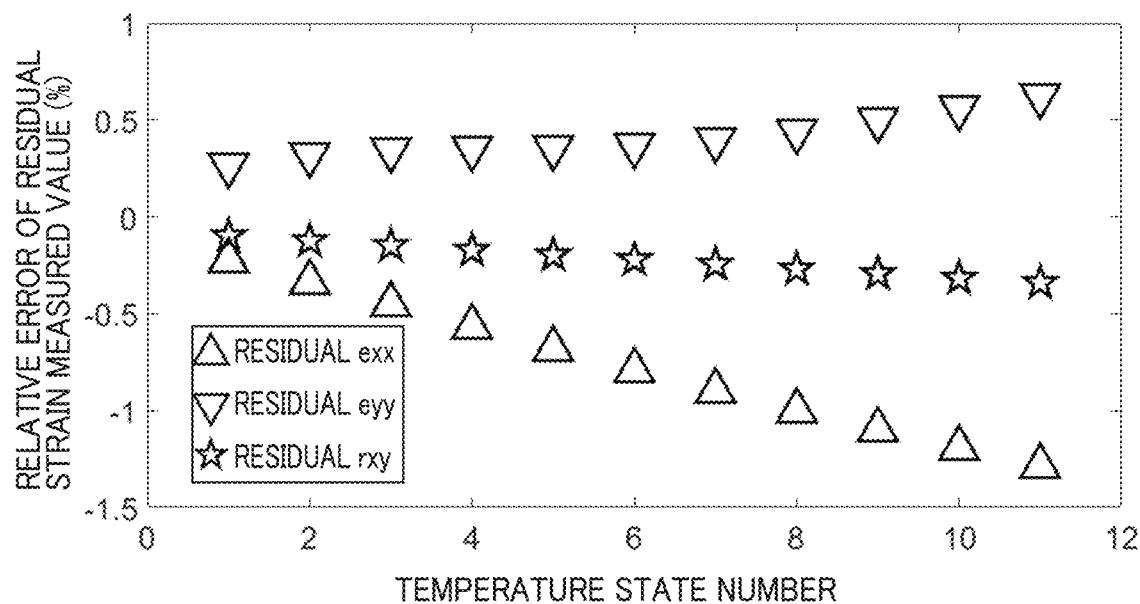
FIG. 9 is a diagram showing relative errors and standard deviations of the measured two-dimensional residual strain in comparison with theoretical values by temperature state numbers.
Figure 9B:
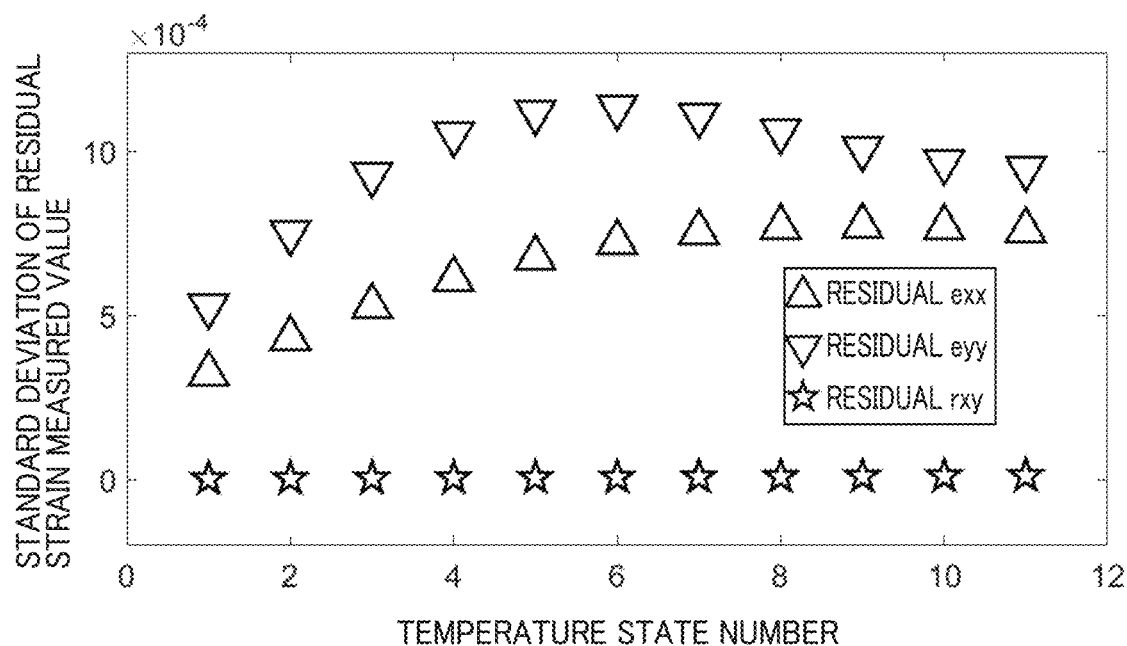

FIG. 9(*a*) shows a plotted relative error of the residual strain measurement value with respect to a temperature state number. FIG. 9(*b*) shows a standard deviation of the residual strain measurement value with respect to the temperature state number. The relative error is within 1.5% and the standard deviation is less than 0.0012. From this, it can be seen that the two-dimensional residual strain measurement according to the present invention can achieve high accuracy.

EXAMPLE 2

Figure 10:
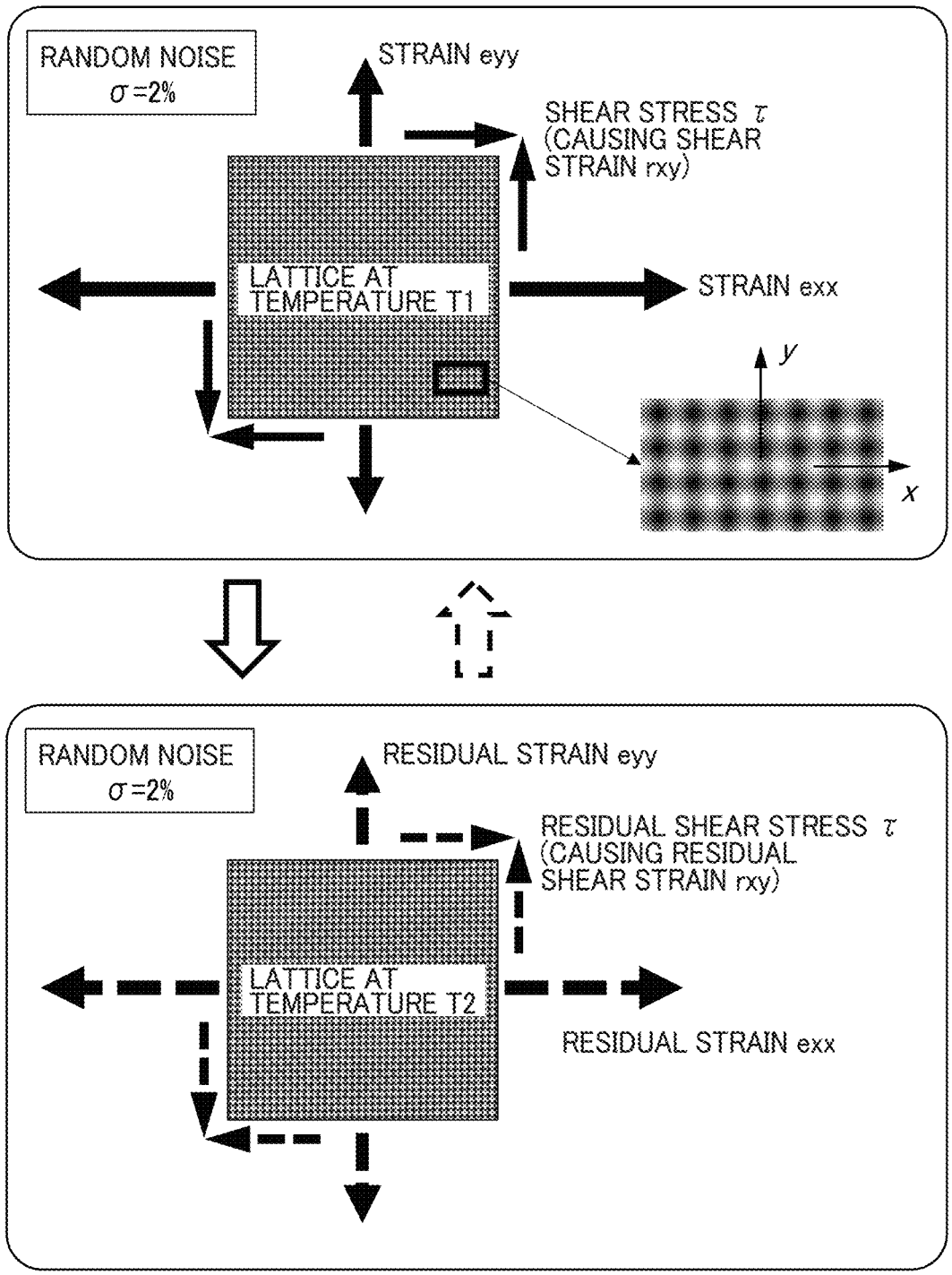
FIG. 10 is a diagram showing how strain and residual strain are applied to transform the lattice when there is random noise of $\sigma=2\%$ in the lattice.

Simulation Verification on Two-Dimensional Residual Strain Measurement of the Present Invention, With Lattice Having Random Noise In this example, description is given of a case where residual strain is determined from a lattice including random noise. As shown in FIG. 10, a two-dimensional lattice at a temperature T1 has a lattice pitch of 10 pixels in both the x-direction and y-direction, and a lattice image has a size of 370×570 pixels. Random noise with an amplitude of 2% of lattice amplitude is applied to the lattice.

The lattice at the temperature T1 is deformed into a lattice at a temperature T2 by applying an x-direction strain, a y-direction strain, and a shear strain thereto. The lattice at the temperature T2 can be transformed into the lattice at the temperature T1 by applying an x-direction residual strain, a y-direction residual strain, and a residual shear strain thereto.

Figure 11A:
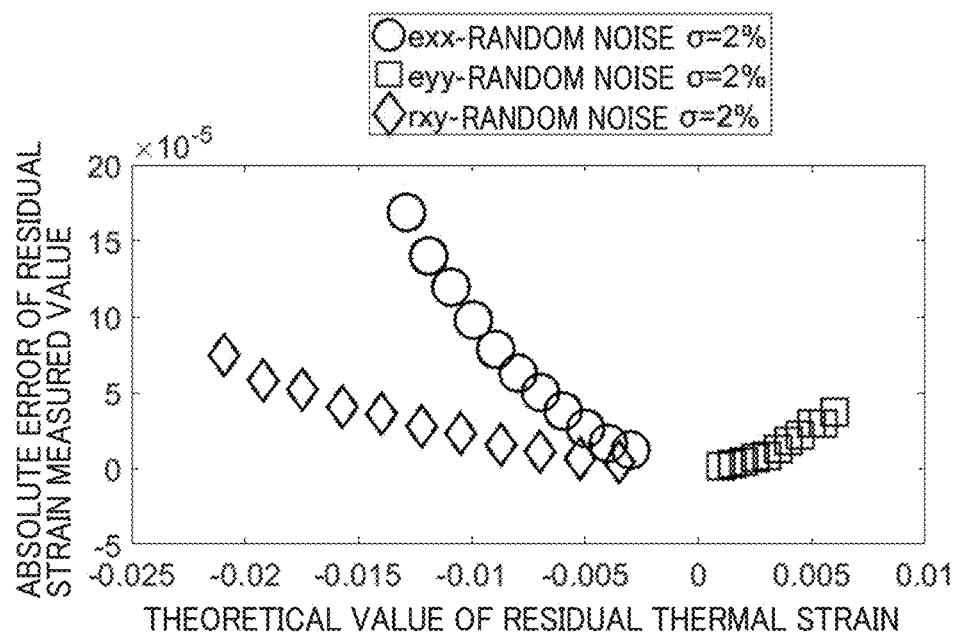
FIG. 11 is a diagram showing a relationship between an absolute error, a relative error, and a standard deviation of the two-dimensional residual strain measured by the method of the present invention when $\sigma=2\%$ and a theoretical residual strain.
Figure 11B:
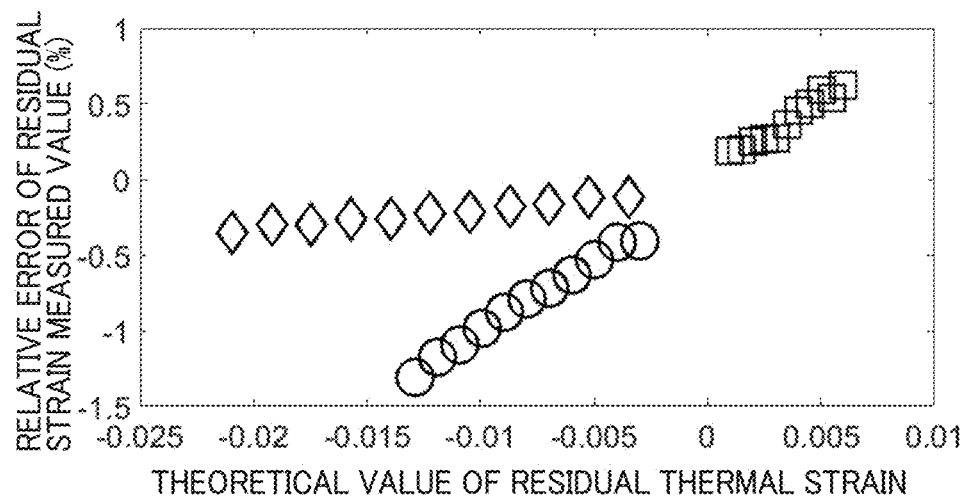
Figure 11C:
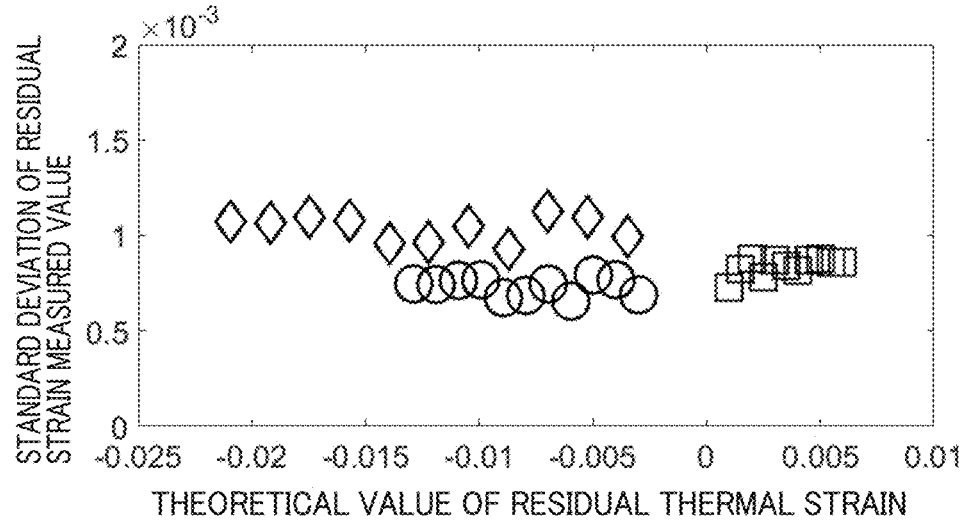

The residual strain of the lattice is measured using the method of the present invention. FIG. 11 shows an absolute error, a relative error and a standard deviation of the residual strain measurement value with respect to a theoretical strain value. As shown in FIG. 11, the absolute error is in the range of 0 to 0.00017, the relative error is in the range of −1.5% to 0.7%, and the standard deviation is less than 0.0012. This shows that the method of the present invention can perform residual strain measurement with high accuracy even when there is random noise in the lattice.

EXAMPLE 3

Two-Dimensional Residual Thermal Strain Measurement of Flip-Chip Underfill Using Visualization of Micro Strain Concentration According to the Present Invention In this example, description is given of two-dimensional strain measurement of a flip chip (FC) underfill using the method of the present invention. FIG. 12 shows the shape and dimensions of a measurement target sample and a heat container used for the measurement in this example. In the range of 1.8×15 mm² of the surface of this FC, an orthogonal lattice with lattice spacing of 3 μm is created by UV nanoimprint lithography at 25° C. A heating test is conducted under a scanning laser microscope. FIG. 13 shows the surface of the FC before and after the creation of the lattice, as well as the created lattice with lattice spacing of 3 μm.

During the heating test, a range of 286×316 μm² in the vicinity of one mold corner (gray colored polygon in FIG. 15) on the FC underfill is selected as a measurement target area. A lattice image of the target area is recorded at 25, 75, 125, and 150° C. to measure corresponding residual thermal strain distribution using the method of the present invention. FIG. 14 shows a lattice image at each of the above temperatures and 8-pixel downsampled moire fringes in the x-direction and y-direction. FIG. 15 shows corresponding phase distributions of these x-direction and y-direction moire fringes.

Figure 16:
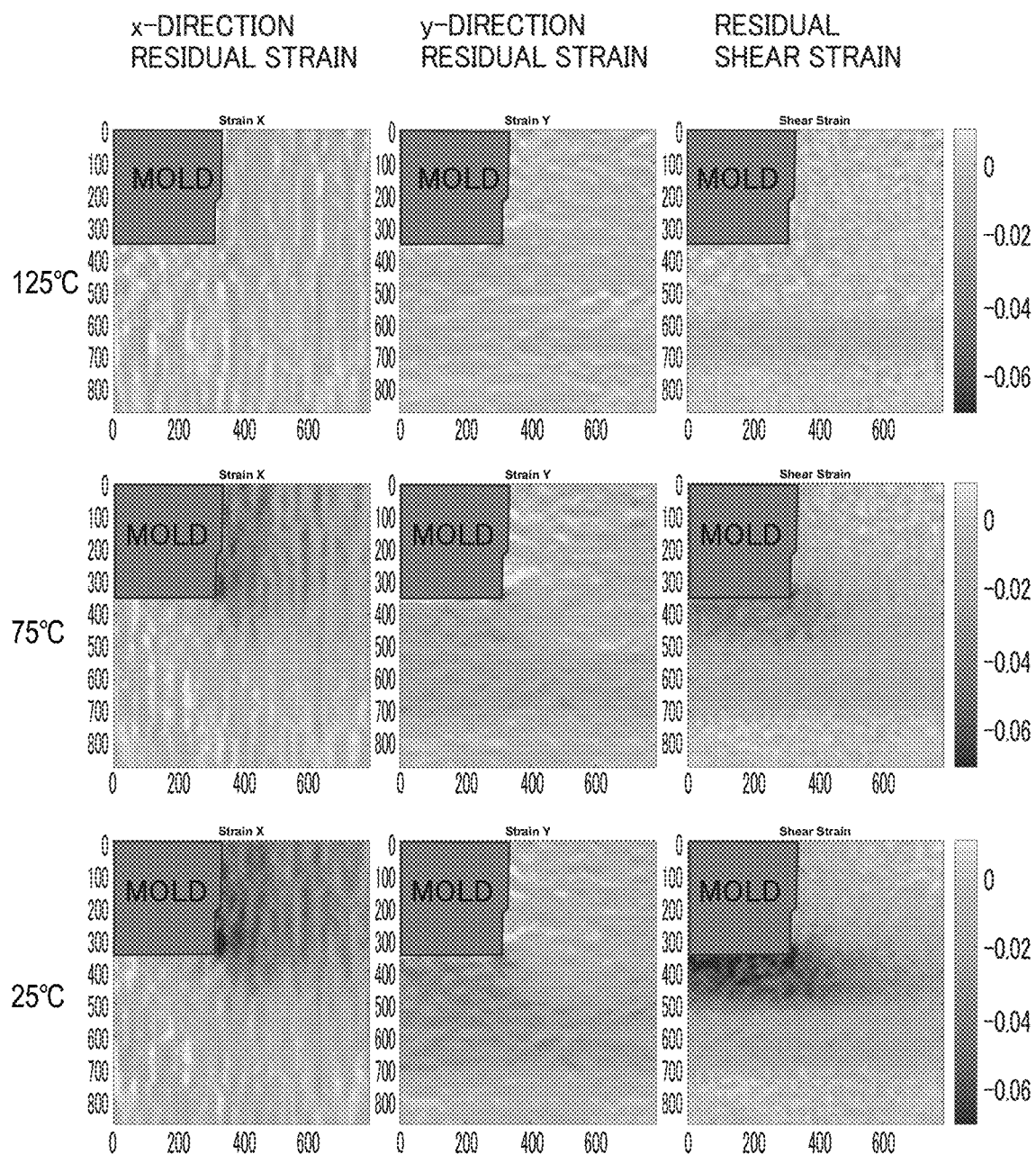
FIG. 16 is a diagram showing x-direction residual strain distribution, y-direction residual strain distribution, and residual shear strain distribution of the sample at 125° C., 75° C., and 25° C.

From a phase difference with respect to the phase at 25° C., x-direction and y-direction strain distribution and shear strain distribution of the underfill can be determined. Since the theoretical strain value of the FC at 150° C. is 0, the method of the present invention can be used to measure a residual strain of the underfill at other temperatures. FIG. 16 shows measurement results of the residual strain distribution in the x-direction and y-direction and the residual shear strain distribution at 125, 75, and 25° C. The absolute value of the x-direction residual strain reaches its maximum at the right-side portion of the mold, particularly at the corner of the mold. The absolute values of the y-direction residual strain and residual shear strain reach their maximum at the bottom of the mold, particularly at the corner of the mold.

Figure 17:
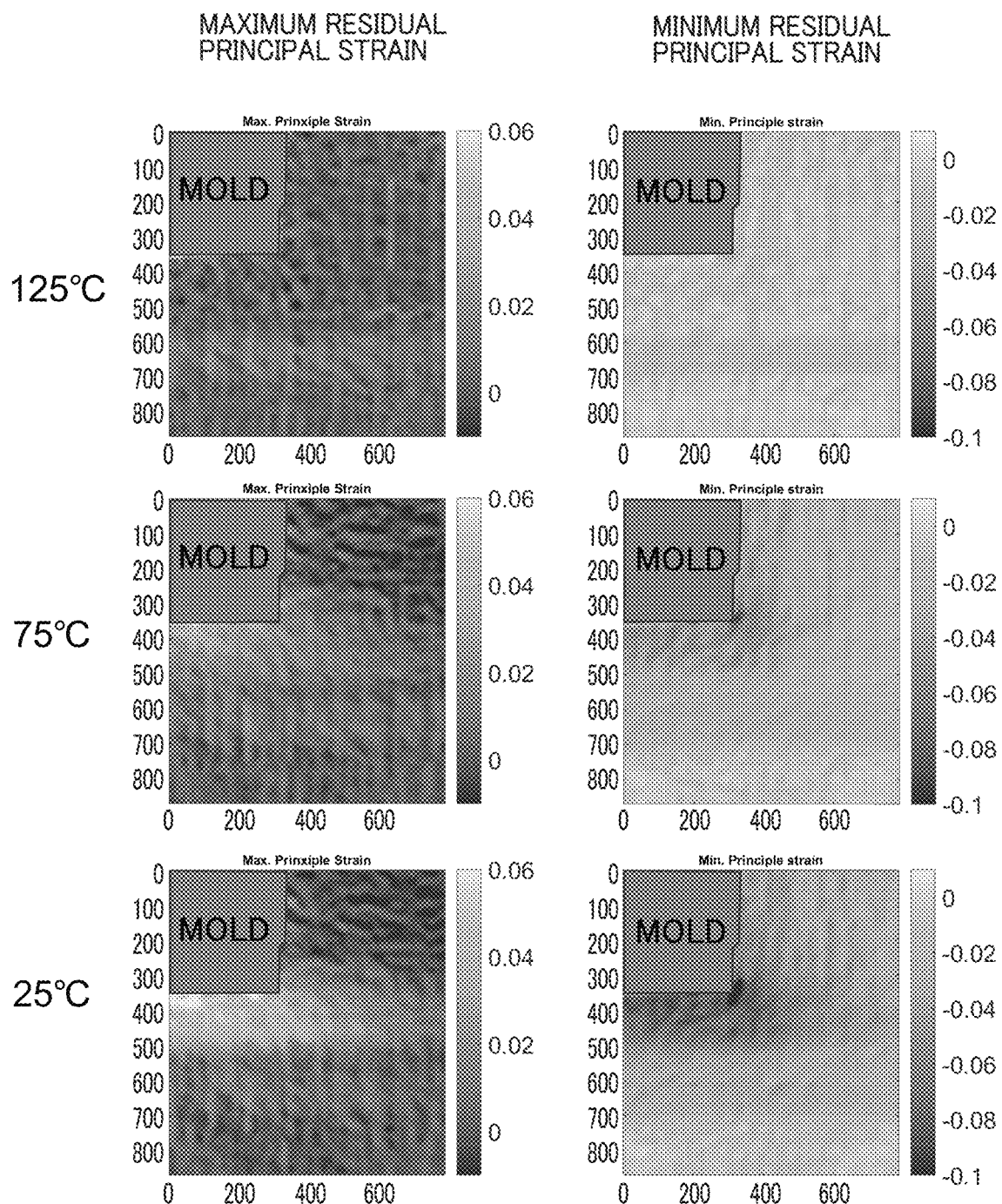
FIG. 17 is a diagram showing maximum and minimum residual principal strain distributions of the sample at 125° C., 75° C., and 25° C.
Figure 18:
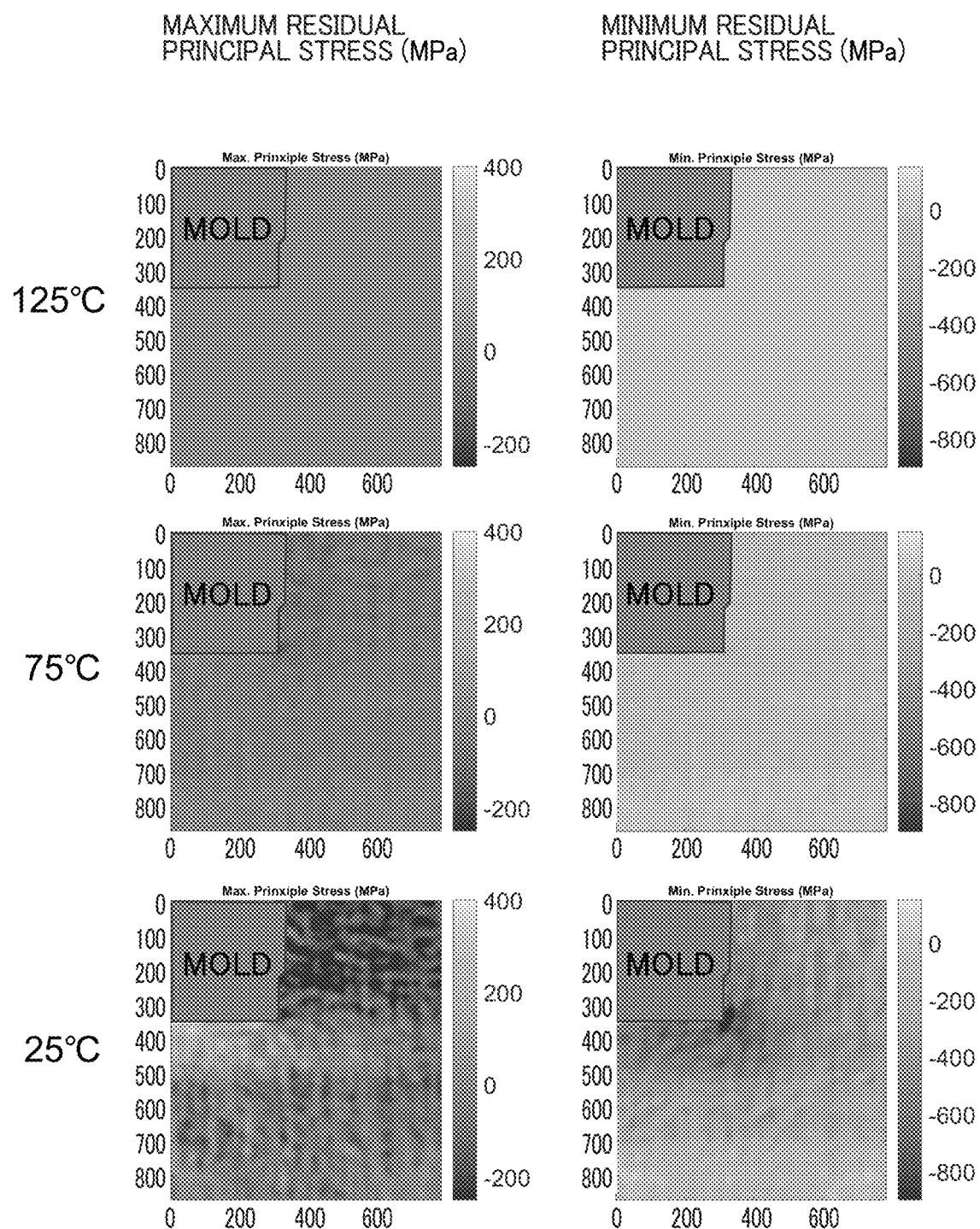
FIG. 18 is a diagram showing maximum and minimum residual principal stress distributions of the sample at 125° C., 75° C., and 25° C.

With Equations (20) and (21), maximum and minimum residual principal strains and maximum and minimum residual principal stresses at 125, 75, and 25° C. are determined. FIG. 17 shows the maximum and minimum residual principal strains, while FIG. 18 shows the maximum and minimum residual principal stresses. The Young's modulus of the underfill is 35, 740, and 7850 MPa at 125, 75, and 25° C., respectively. Meanwhile, the Poisson's ratio is set to 0.45, 0.45, and 0.30, respectively.

These results reveal that the maximum residual principal strain is largest at the bottom of the mold, and the absolute value of the minimum principal strain reaches its maximum at the corner of the mold. The residual principal stress shows the same distribution as that of the residual principal strain.

As described above, according to the embodiment of the present invention, the distributions of the x-direction residual strain, the y-direction residual strain, the residual shear strain, and the residual principal strain can be collectively and accurately measured. Also, as for measurement of a residual thermal strain and a residual thermal stress, highly accurate automatic batch processing and high-speed image storage can be performed. Moreover, the moire method according to this embodiment is suitable for dynamic deformation measurement, and the measurement result can be displayed in real time.

INDUSTRIAL APPLICABILITY

The residual thermal strain distribution measurement method of the present invention, the device therefor, and the program therefor can be applied to the fields of aerospace, automobile, electronic component packaging, medicine, material manufacture, and the like. The method of the present invention is useful for defect analysis, residual stress measurement, material strength improvement from nanometer to meter level, optimum design of interface, production quality control, structural soundness monitoring, and the like.

REFERENCE SIGNS LIST

1 Thermal Deformation Measurement Device
10 Lattice Image Recorder
20 Computer
21 Processor
22 Memory
221 Moire Fringe Generation Unit
222 Phase Processing Unit
223 Residual Deformation Calculation Unit
23 Input Device
24 Output Device
30 Heat Container

The invention claimed is:

1. A residual thermal strain distribution measurement method of measuring a residual thermal strain distribution as residual thermal deformation in a sample generated when a thermal load is applied to the sample, comprising:
   recording images of a periodic pattern present on a surface of the sample, by an image recording unit, at a first temperature and a sample formation temperature that is a temperature at which the sample is formed;
   generating moiré fringes based on each of the recorded images of the periodic pattern;
   calculating a phase of the moiré fringes for the sample at the first temperature;
   calculating a phase of the moiré fringes for the sample at the sample formation temperature;
   acquiring a phase difference of the moiré fringes at the sample formation temperature with respect to the first temperature; and
   calculating a residual thermal strain of the sample at the first temperature with respect to the sample formation temperature based on the acquired phase difference.

2. The residual thermal strain distribution measurement method according to claim 1, further comprising:
   recording an image of the periodic pattern present on the surface of the sample, by the image recording unit, at a second temperature different from the first temperature and the sample formation temperature;
   generating moiré fringes based on the recorded image of the periodic pattern at the second temperature;
   calculating a phase of the moiré fringes for the sample at the second temperature; and
   acquiring a phase difference of the moiré fringes at the second temperature with respect to the first temperature to calculate a residual thermal strain of the sample at the second temperature.

3. The residual thermal strain distribution measurement method according to claim 1, wherein
   the first temperature is a room temperature.

4. The residual thermal strain distribution measurement method according to claim 1, wherein
   a residual thermal stress distribution is further calculated from the calculated residual thermal strain distribution by applying the Hooke's law to a plane stress problem.

5. The residual thermal strain distribution measurement method according to claim 1, comprising:
   when the periodic pattern is not present on the surface of the sample, creating a periodic pattern on the surface of the sample at the first temperature.

6. A residual thermal strain measurement device comprising:

a load application unit which applies a thermal load to a sample;

an image recording unit which records images of a periodic pattern present on the surface of the sample at a first temperature and a sample formation temperature that is a temperature at which the sample is formed;

a residual thermal strain measurement unit which
generates moiré fringes based on each of the recorded images of the periodic pattern,
calculates a phase of the moiré fringes for the sample at the first temperature,
calculates a phase of the moiré fringes for the sample at the sample formation temperature,
acquires a phase difference of the moiré fringes at the sample formation temperature with respect to the first temperature, and
calculates a residual thermal strain of the sample at the first temperature with respect to the sample formation temperature based on the acquired phase difference; and an output unit which outputs the calculation result.

7. A computer including a processor and a memory comprising:

a software routine stored in the memory, the software routine causing the computer to execute the following processing steps:
receiving an input of image data of a periodic pattern on a sample surface at a first temperature and a sample formation temperature, and an input of analysis parameters;
searching for the periodic pattern of the same size in the same area on the sample;
generating moiré fringes based on each image of the periodic pattern;
calculating a phase of the moiré fringes for the sample at the first temperature;
calculating a phase of the moiré fringes for the sample at the sample formation temperature;
acquiring a phase difference of the moiré fringes at the sample formation temperature with respect to the first temperature;
calculating a residual thermal strain of the sample at the first temperature with respect to the sample formation temperature based on the acquired phase difference; and
outputting the calculation result.

* * * * *